US011615707B2

(12) United States Patent
Kreiling et al.

(10) Patent No.: US 11,615,707 B2
(45) Date of Patent: Mar. 28, 2023

(54) GUIDANCE DISPLAY SYSTEM FOR WORK VEHICLES AND WORK IMPLEMENTS

(71) Applicant: Deere & Company, Moline, IL (US)

(72) Inventors: Jeffery R. Kreiling, Dubuque, IA (US); Juan Daniel González, Ramos Arizpe (MX); Ignacio Alonso Martinez, Ramos Arizpe (MX)

(73) Assignee: DEERE & COMPANY, Moline, IL (US)

( * ) Notice: Subject to any disclaimer, the term of this patent is extended or adjusted under 35 U.S.C. 154(b) by 115 days.

(21) Appl. No.: 16/949,437

(22) Filed: Oct. 29, 2020

(65) Prior Publication Data

US 2021/0043085 A1    Feb. 11, 2021

Related U.S. Application Data

(63) Continuation-in-part of application No. 16/424,772, filed on May 29, 2019, now Pat. No. 11,204,254.

(51) Int. Cl.
| | | |
|---|---|---|
| *G08G 1/0968* | (2006.01) | |
| *A01D 87/12* | (2006.01) | |
| *E02F 9/26* | (2006.01) | |
| *G01C 21/36* | (2006.01) | |
| *G01C 21/16* | (2006.01) | |

(Continued)

(52) U.S. Cl.
CPC ..... *G08G 1/096855* (2013.01); *A01D 87/127* (2013.01); *E02F 9/261* (2013.01); *G01C 21/1656* (2020.08); *G01C 21/265* (2013.01); *G01C 21/3647* (2013.01); *E02F 3/32* (2013.01)

(58) Field of Classification Search
CPC .......... G08G 1/096855; G01C 21/1656; G01C 21/265; G01C 21/3647
See application file for complete search history.

(56) References Cited

U.S. PATENT DOCUMENTS

| | | | |
|---|---|---|---|
| 6,167,337 A | 12/2000 | Haack et al. | |
| 2005/0281656 A1* | 12/2005 | Bozem | B66F 17/003 414/635 |
| 2009/0116942 A1 | 5/2009 | Hackett et al. | |

(Continued)

FOREIGN PATENT DOCUMENTS

| | | |
|---|---|---|
| DE | 102007011180 A1 | 9/2008 |
| DE | 102013006464 A1 | 10/2013 |

(Continued)

OTHER PUBLICATIONS

German Search Report issued in application No. DE102021210907.1 dated May 16, 2022 (10 pages).

(Continued)

*Primary Examiner* — Terrell M Robinson

(57) ABSTRACT

A work vehicle guidance display system comprising: at least one imaging device disposed on a work vehicle; a display disposed in the work vehicle configured to display images from the imaging device; and a controller configured to: select a field of view of the imaging device to display; receive a static dimension associated with the work vehicle; receive a dynamic dimension associated with the work vehicle; and display on the display a field view with a first machine travel path based on the static dimension and a second machine travel path based on the dynamic dimension.

19 Claims, 14 Drawing Sheets

(51) Int. Cl.
*G01C 21/26* (2006.01)
*E02F 3/32* (2006.01)

(56) References Cited

U.S. PATENT DOCUMENTS

| | | |
|---|---|---|
| 2011/0196565 A1 | 8/2011 | Collins et al. |
| 2012/0024146 A1* | 2/2012 | Saito .................... E02F 9/2296 |
| | | 91/525 |
| 2012/0057956 A1* | 3/2012 | Shirao .................... E02F 3/433 |
| | | 414/707 |
| 2013/0013251 A1* | 1/2013 | Schoonmaker ......... B66C 15/04 |
| | | 702/152 |
| 2013/0158784 A1 | 6/2013 | Fukano et al. |
| 2014/0107897 A1 | 4/2014 | Zhu et al. |
| 2014/0347483 A1 | 11/2014 | Nakanishi et al. |
| 2015/0046043 A1* | 2/2015 | Bollin .................. A01D 41/127 |
| | | 701/50 |
| 2017/0080976 A1 | 3/2017 | Choi et al. |
| 2018/0072542 A1 | 3/2018 | Ishikawa |
| 2018/0094408 A1 | 4/2018 | Shintani et al. |
| 2018/0277067 A1 | 9/2018 | Tentinger et al. |
| 2019/0093321 A1 | 3/2019 | Hiekata |
| 2019/0360177 A1 | 11/2019 | Kiyota et al. |

FOREIGN PATENT DOCUMENTS

| | | |
|---|---|---|
| DE | 102014205182 A1 | 10/2014 |
| EP | 3279133 A1 | 2/2018 |
| EP | 3409848 A1 | 12/2018 |
| JP | S4931104 A | 3/1974 |
| WO | WO2016168650 A1 | 10/2016 |
| WO | WO2018151280 A1 | 12/2019 |

OTHER PUBLICATIONS

Lexus, 2019 Lexus RX Luxury Crossover Safety Brochure, pp. 1-7, [online], [retrieved on May 29, 2019], Retrieved from the Internet <URL: http://www.lexus.com/models/RX/safety/backup-camera-with-dynamic-gridlines>.

European Search Report issued in counterpart application No. 20176982.5 dated Dec. 15, 2020 (12 pages).

European Search Report issued in counterpart application No. 20176982.5 dated Sep. 14, 2020 (14 pages).

* cited by examiner

GUIDANCE DISPLAY SYSTEM FOR WORK VEHICLES AND WORK IMPLEMENTS

CROSS-REFERENCE TO RELATED APPLICATION(S)

This patent is a continuation-in-part of U.S. patent application Ser. No. 16/424,772 filed on May 29, 2019. U.S. patent application Ser. No. 16/424,772 is hereby incorporated herein by reference in its entirety.

STATEMENT OF FEDERALLY SPONSORED RESEARCH OR DEVELOPMENT

Not applicable.

FIELD OF THE DISCLOSURE

This disclosure relates to guidance display systems for use onboard work vehicles and/or work vehicles equipped with work implements.

ABBREVIATIONS

Abbreviations appearing relatively infrequently in this document are defined upon initial usage, while abbreviations appearing more frequently in this document are defined below:
  HDD—Head down display;
  HUD—Head up display;
  FEL—front end loader; and
  FOV—field of view.

BACKGROUND OF THE DISCLOSURE

Work vehicles are commonly equipped with specialized tools or work implements useful in performing tasks in the agricultural, forestry, construction, and mining industries. Certain work vehicles are equipped with a single work implement, which may be mounted to either the front end or the back end of a work vehicle. Other work vehicles may be equipped with both front and rear work implements. Depending on design, a work implement may be affixed to a work vehicle in a manner not intended for in-field removal, such as in the case of specialized work vehicles utilized in the forestry and construction industries. In other instances, a work implement may be mounted to a work vehicle in a modular fashion permitting the work implement to be readily interchanged with other work implements suited for varying work tasks. Such modular work implements are commonly utilized in conjunction with tractors, which may be capable of concurrently supporting both front and rear work implements.

In many instances, a work implement may be mounted to a particular end of a work vehicle through a boom assembly, which permits movement of the work implement in multiple degrees of freedom relative to the work vehicle chassis. Again, referring to a tractor as an example, a loader bucket, a bale spear attachment, a bale squeeze, a grab fork, or another work implement may be removably mounted to the front end of the tractor by a hydraulically actuated boom assembly. The boom assembly may allow movement of the work implement relative to the tractor chassis over a relatively broad range of motion and through positions limiting operator visibility of the work implement and its surrounding environment. Concurrently, the tractor may be navigated over fields or other work areas containing obstructions and uneven terrain. Such factors may render it difficult for an operator to consistently command movement of a work implement in an intended manner (e.g., along an optimal path in three-dimensional space) when performing material handling operations and other tasks requiring relatively precise navigation of the work implement. Overall productivity levels may be reduced as a result, while undesirably high mental workloads are placed on the operator of the work vehicle.

SUMMARY OF THE DISCLOSURE

Display systems are disclosed for usage onboard a work vehicle. Embodiments of a work vehicle display system comprising: at least one imaging device disposed on a work vehicle; a display disposed in the work vehicle configured to display images from the imaging device; and a controller configured to: select a field of view of the imaging device to display; receive a static dimension associated with the work vehicle; receive a dynamic dimension associated with the work vehicle; and display on the display a field of view with a first machine travel path based on the static dimension and a second machine travel path based on the dynamic dimension.

In further embodiments, a method for displaying work vehicle travel paths, the method comprising: selecting, with a controller on the work vehicle, a field of view from a plurality of imaging devices associated with the work vehicle; generating, with the controller, a first machine travel path based on a static dimension associated with the work vehicle; generating, with the controller, a second machine travel path based on a dynamic dimension associated with the work vehicle; and displaying, on a display within work vehicle, the field of view with the first machine travel path and the second machine travel path.

In further embodiments, a work vehicle display system comprising: at least one imaging device disposed on a work vehicle; a display disposed in the work vehicle configured to display images from the imaging device; and a controller configured to: select a field of view of the imaging device to display; receive a static dimension associated with the work vehicle; receive a dynamic dimension associated with the work vehicle; generate a first machine travel path based on the static dimension and a second machine travel path based on the dynamic dimension; and transmit to the display, the greater of the first machine travel path or the second machine travel path.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
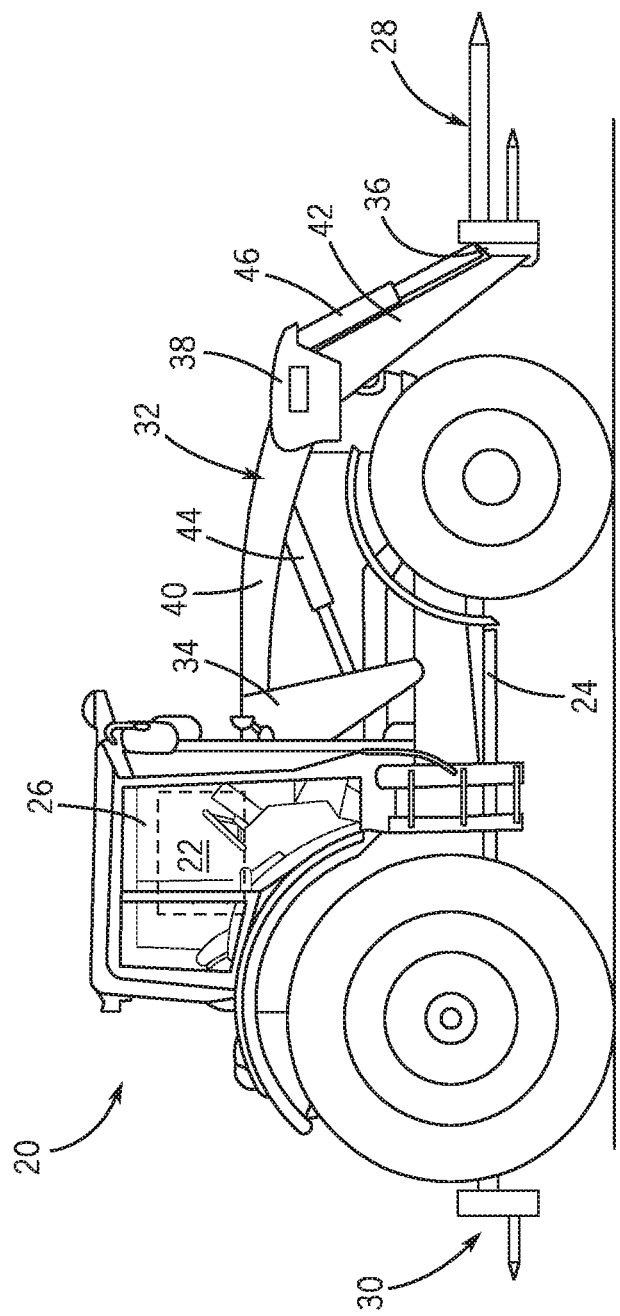
FIG. 1 is a side view of an example work vehicle (here, a tractor) equipped with an embodiment of an implement guidance display system according to this disclosure.

For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

OVERVIEW

Certain work vehicles can be equipped with onboard or in-cab displays showing a symbology or graphics of the work vehicle (e.g. pictorial, real time image) with one or more guidelines overlaid on the representation and corresponding to a direction of travel of the work vehicle. When the work vehicle has a static dimension, such as a work vehicle with a fixed width, the guidelines on the display are generally easy to generate and do not require ongoing adjustment. However, work vehicles that pivot, rotate or articulate (e.g., tracked feller buncher, excavator or articulated dump truck) may have one or more dynamic dimensions as opposed to a static dimension, the guidelines displayed should change as the angle of the rotation, pivot or articulation of the work vehicle is changed. This disclosure provides a display system and method for showing guidelines representing both a static dimension and a dynamic dimension to show the true path of the machine on the display.

The following describes embodiments of implement guidance display systems for usage onboard work vehicles having one or more static and dynamic dimensions (e.g., due to the components of the work vehicle or due to work implements attached to the work vehicle). During operation, the implement guidance display system generates certain unique symbology or graphics (herein, "implement guidance symbology") assisting an operator of the work vehicle in controlling work implement movement in an intended, predictable, and precise manner. The implement guidance symbology may assume different forms and visually convey key informational items pertaining to the forecast movement of one or more work implements, whether due to independent movement of the work implement relative to a chassis of a work vehicle, due to movement of the work vehicle chassis itself, or a combination thereof. By providing such visual guidance or cues in the form of the below-described implement guidance symbology, embodiments of the implement guidance display system enhance operator awareness and efficacy to alleviate the mental workload placed on the operator and to improve the overall productivity levels in executing tasks, such as material handling operations, demanding relatively precise and/or repetitive work implement movement.

The implement guidance system may be employed to provide an operator of a work vehicle a graphical representation of a projected trajectory of the implement relative to a target to which the implement is to be applied. By way of example, the implement may be the bucket of a front-end loader that is directed at a pile of gravel. In such a case, the bucket may be raised and lowered by boom or loader arms as well as pivoted about a lateral axis (perpendicular to the heading or direction of travel of the work vehicle) to which the bucket mounts to the loader arms. In other examples, the work implement may have one or more additional degrees of freedom, such as being pivotal about a vertical or other upright axis and/or a longitudinal axis aligned with the direction of travel. Further, the work implement may be mounted to the work vehicle by an articulating or jointed boom linkage, which allows the work implement to be moved in three dimensions relative to the work vehicle and to orient the work implement in various attitudes relative to the work vehicle. The felling or saw head of a feller buncher is one such example in which the saw head is attached by an articulable wrist to a boom linkage mounted to the work vehicle so that the position and attitude of the saw head may be moved relative to the work vehicle essentially limitlessly.

The projection of the work implement trajectory may thus be effected by an assessment of only its motion (in terms of one or both of its spatial position and orientational attitude) relative to the work vehicle chassis, or this combined with an assessment of the heading of the work vehicle. The motion of the work implement may be a single degree of freedom motion such as a change of only its spatial position or its attitude relative to the work vehicle chassis (e.g., only a pivotal motion such as a bucket tilt), or it may be a multiple degree of freedom, compound motion affecting both its spatial position and attitude (e.g., raising/lowering on loader arms and tilting a bucket or extending/retracting, swinging and tilting a bucket on a boom linkage). In other contexts, such compound motion may include additional degrees of freedom. In the case of the saw head of a feller buncher, for example, this could include rotation about a fore-aft axis generally in the travel direction of the work vehicle.

In embodiments, the implement guidance symbology may include graphics visually identifying a path along which the work implement is projected to travel; e.g., as determined based upon the present orientation (e.g., spatial position and attitude) of the work implement, operator input commands controlling movement of the work vehicle chassis or the work implement itself (again, if independently movable relative to the chassis), and/or sensor data describing a current motion state of the work implement. Such graphics (herein, the "projected implement path graphic") may be aligned with the present orientation of the work implement, as generated on a display containing the implement guidance symbology (herein, an "implement guidance display"). The projected implement path graphic may also convey other useful information pertaining to the work implement, such as critical dimensions (e.g., a maximum width) of the work implement. In embodiments, in at least some instances, a default, baseline, or "zero deviation" implement path graphic may be selectively generated in conjunction with the projected implement path graphic on the implement guidance display. When generated, the zero deviation implement path graphic usefully provides visual contrast with the projected implement path graphic, particularly when appreciably deviating from a zero deviation path; that is, the path traveled by the implement when in a predetermined vertical position (e.g., a lowered or near-ground position) and when the work vehicle chassis travels along a straight line in either a forward direction (when the implement guidance symbology pertains to a forward work implement) or a rearward direction (when the implement guidance symbology pertains to a rear work implement).

The zero deviation implement path graphic may correspond to the heading of the work vehicle chassis in some instances, for example, when the work implement is attached to the work vehicle in a manner in which its spatial position is fixed relative to the chassis. In such cases, the zero deviation implement path graphic may be considered a projected trajectory of the work vehicle. In other cases, the zero deviation implement path will diverge from the work vehicle heading such that it will not indicate the projected trajectory of the work vehicle. In such cases, or even if not, a work vehicle path graphic may be generated and visually displayed to the operator along with the implement trajectory graphic. Such a work vehicle trajectory path may be provided in both forward and reverse travel directions or when the work vehicle is stationary and steering input is provided by the operator or other onboard or remote steering controls.

In some cases, the graphics for the implement trajectory projection and the work vehicle trajectory projection (and the zero deviation implement path) may be the same or overlap completely if displayed concurrently on the same screen. However, typically the graphics will be displayed as the distinct projections that they represent. It may be, for example, that the work vehicle trajectory projection graphic takes a generally two dimensional planar form (such as when the work vehicle is on level ground and/or stationary), or it may take a generally three dimensional form following along or within a continuum of consecutive, adjacent or overlapping reference planes (such as when the work vehicle is on or traversing uneven terrain). The work implement trajectory projection may likewise take the form of a generally two dimensional planar graphic or follow or lie within a generally three-dimensional continuum of planes. In all cases where the work vehicle trajectory differs from the work implement trajectory then, the graphics will be represented in different planes or planar continuums such that one is either spaced vertically from, but parallel with, the other, or at an angle thereto, such as an angle within an oblique plane or planes containing upright and forward/reverse travel direction components or upright and lateral/side-to-side (perpendicular to travel) components relative to the plane or planes of the work vehicle trajectory projection graphic.

Moreover, the heading or travel directional aspect of the work implement trajectory projection may or may not align with that of the work vehicle depending on the type of work implement and the degrees of freedom in its movement. For example, a work implement that is fixed in spatial position relative to the work vehicle chassis and can only pivot about one axis to change its attitude in one dimension will generally follow the heading of the work vehicle. However, the work vehicle heading may often differ from that for work implements with more degrees of freedom, such as those mounted by booms, wrists or various swivels or multi-directional knuckles.

Other implement guidance symbology potentially generated by the implement guidance display system includes graphical elements (e.g., markers or icons) identifying projected future orientation(s) of key feature(s) of the work implement, such as the leading bale spear tip(s) of a bale spear attachment, when the work implement reaches the far end or distal edge of the projected work implement path; the terms "far," "distal," "near," and "proximal," as appearing herein, defined based upon proximity to the work vehicle chassis. Embodiments of the implement guidance display system may also generate other graphics or symbology pertaining to work implement movement and positioning including, but not limited to: (i) graphical depictions of the type work implement currently mounted to the work vehicle (as usefully presented when the implement guidance display is generated as a HDD in which the actual work implement cannot be seen), (ii) graphics indicative of a current tilt angle of the work implement (when capable of tilting relative to the work vehicle chassis), and/or (iii) graphics visually denoting a projected path of the work vehicle chassis (herein, a "projected vehicle path graphic").

In various implementations, the implement guidance symbology may be generated in a three-dimensional, perspective format and visually integrated into (e.g., overlaid or superimposed over) a real-world view of the environment surrounding a work implement. As an example, the implement guidance symbology may be generated on a HUD device having a transparent screen through which the surrounding environment of the work implement is viewed by an operator when seated within the operator station or cabin of a work vehicle. Additionally, or alternatively, a live video feed may be presented on an HDD device (e.g., a monitor) located within the operator station, with the implement guidance symbology superimposed over or otherwise visually integrated into the live video feed and aligned with the present vertical position of the work implement (when movable relative to the work vehicle chassis). In other instances, the implement guidance symbology may be presented in the context of a virtual representation of the surrounding environment of the work vehicle; e.g., as may be the case when the implement guidance display is presented in a three dimensional (e.g., perspective or isometric) format, as seen from a vantage point offset from the work vehicle by some distance. In still further instances, the implement guidance display may be generated in a two-dimensional format, such as horizontal situation (top-down) display or a vertical situation display. When generated as a horizontal situation or top-down display, in particular, the implement guidance symbology may again be integrated into a live video feed of the environment surrounding the work vehicle as captured by multiple imaging devices (e.g., cameras) positioned around the work vehicle, with the camera feeds combined accordingly.

The implement guidance display system may generate any practical number of implement guidance displays on at least one display device situated within the operator station of the work vehicle; or, perhaps, carried into the operator station by an operator of the work vehicle. For example, in certain instances, the implement guidance display system may selectively generate: (i) a forward-looking display (herein, "a forward implement guidance display") presenting implement guidance symbology corresponding to a work implement mounted to a front end of a tractor or other work vehicle, and (ii) a rear-looking display (herein, "a rear implement guidance display") presenting implement guidance symbology corresponding to a work implement mounted to a rear end of the work vehicle. In such instances, the forward implement guidance display and rear implement guidance display may be generated concurrently on a single display device (e.g., in a side-by-side or picture-in-picture format), generated concurrently on different display devices, and/or generated in mutually exclusive manner on a single display device. In this latter regard, an operator may switch between presentation of the forward implement guidance display or the rear implement guidance display on the display device via interaction with the display device (e.g., via touch input if the display device is so capable) or utilizing another operator input device.

An example of a work vehicle equipped with the implement guidance display system will now be described with reference to FIGS. 1-9. In the below-described example, the work vehicle assumes the form of a tractor equipped with two work implements: an FEL bale spear attachment and a rear bale spear attachment. The following notwithstanding, it is emphasized that embodiments of the implement guidance display system are not restricted to usage in conjunction with any particular type of work vehicle, providing the work vehicle is equipped with (or can be equipped with) at least one work implement, regardless of whether of the work implement is movable relative to the body or chassis of the work vehicle. Generally, then, embodiments of the implement guidance display system can be integrated into a wide variety of work vehicles equipped with numerous types of work implements. To provide but a few additional examples, a non-exhaustive list of other work implements and work vehicles for which the embodiments of the display system may usefully generate implement guidance symbology includes the felling head of a feller buncher, the bucket (or other end effector) of an excavator, the blade of a dozer, and various other attachments (e.g., a bale squeeze, a fork lift, an FEL bucket, or the like) mounted to the front end or rear end of a tractor.

For purposes of this disclosure the term "work implement" and its derivatives refers to a component of a work vehicle, such as may be used in the agriculture, construction, forestry, mining or other such industries, that is attached to or is otherwise carried by a work vehicle and employed to impart a working action on something exogenous to the work vehicle itself. This includes the implements noted above as well as numerous other attachments and end effectors, and it excludes various other components of the machine, which, as part of the work vehicle, are for the purpose of operating the work vehicle itself. Examples of such work vehicle components that are excluded from the rubric of work implements as pertinent here include, but are not limited to, various engines, motors, actuators and steering mechanisms (including steerable and non-steerable (differential power) wheels).

Example of a Work Vehicle Equipped with an Work Implement and an Implement Guidance Display System FIG. 1 is a side view of a work vehicle (here, a loader 20) equipped with an embodiment of the implement guidance display system, as generically represented by box 22 and discussed more fully below in connection with FIGS. 2-9. In addition to the implement guidance display system 22, the loader 20 includes a wheeled body or chassis 24 and an operator station or cabin 26. An FEL bale spear attachment 28 and a rear bale spear attachment 30 (here, a three-point hitch attachment) are mounted to the front end and the rear end of the tractor chassis 24, respectively. The FEL bale spear attachment 28, in particular, is mounted to the front end of the tractor chassis 24 by a hydraulically actuated boom assembly 32, which enables movement of the FEL bale spear attachment 28 relative to the tractor chassis 24 in multiple degrees of freedom. Comparatively, the rear bale spear attachment 30 is mounted to the rear end of the tractor chassis 24 in a fixed relationship such that the attachment 30 cannot move relative to the chassis 24. In further embodiments, however, the rear bale spear attachment 30 (or a different rear-mounted implement) may be mounted to the rear of the tractor chassis 24 by a boom assembly or, perhaps, in another manner permitting movement of the attachment 30 relative to the tractor chassis 24 in one or more degrees of freedom.

In the example of FIG. 1, the hydraulically actuated boom assembly 32 includes an aft bracket 34 affixed to the tractor chassis 24, a forward bracket 36 to which the FEL bale spear attachment 28 is pivotally attached, and an intermediate or mid bracket 38 situated between the brackets 34, 36. Twin upper loader arms 40 (one of which can be seen in FIG. 1) pivotally attach the aft bracket 34 to the mid bracket 38, which is, in turn, attached to the forward bracket 36 by twin lower loader arms 42 (again only one of which can be seen). Twin hydraulic lift cylinders 44 are further mounted between the aft bracket 34 and the mid bracket 38, while twin hydraulic bucket cylinders 46 are mounted between the mid bracket 38 and the forward bracket 36. Non-illustrated hydraulic lines of the boom assembly 32 are further present and fluidly connected to a pressurized hydraulic fluid supply on the loader 20 in a manner permitting an operator seated within the operator station 26 to control the hydraulic cylinders 44, 46.

An operator can command the boom assembly 32 to lift the FEL bale spear attachment 28 from the illustrated home orientation (that is, the non-tilted, lowered position) by controlling the hydraulic lift cylinders 44 to extend in a desired manner. As the hydraulic lift cylinders 44 extend, the FEL bale spear attachment 28 lifts from the lowered home orientation shown in FIG. 1, travels through an intermediate or mast level position, and is ultimately raised to a full height position located above the operator station 26. Similarly, as the hydraulic bucket cylinders 46 retract in response to operator commands, the boom assembly 32 tilts the FEL bale spear attachment 28 from forward-facing angular orientation shown in FIG. 1 toward an increasingly upright orientation; that is, such that the bale spears included in the FEL bale spear attachment 28 rotate upwardly toward the front hood or windshield of the loader 20. Conversely, from the full height position, the operator can control the boom assembly 32 to stroke the hydraulic cylinders 44, 46 in an opposing to return the FEL bale spear attachment 28 to the lowered, non-tilted, lowered position shown in FIG. 1. The operator may control the cylinders 44, 46 to extend and retract, as desired, through movement of a suitable control interface (e.g., a joystick) located within the operator station 26 of the loader 20.

Figure 2:
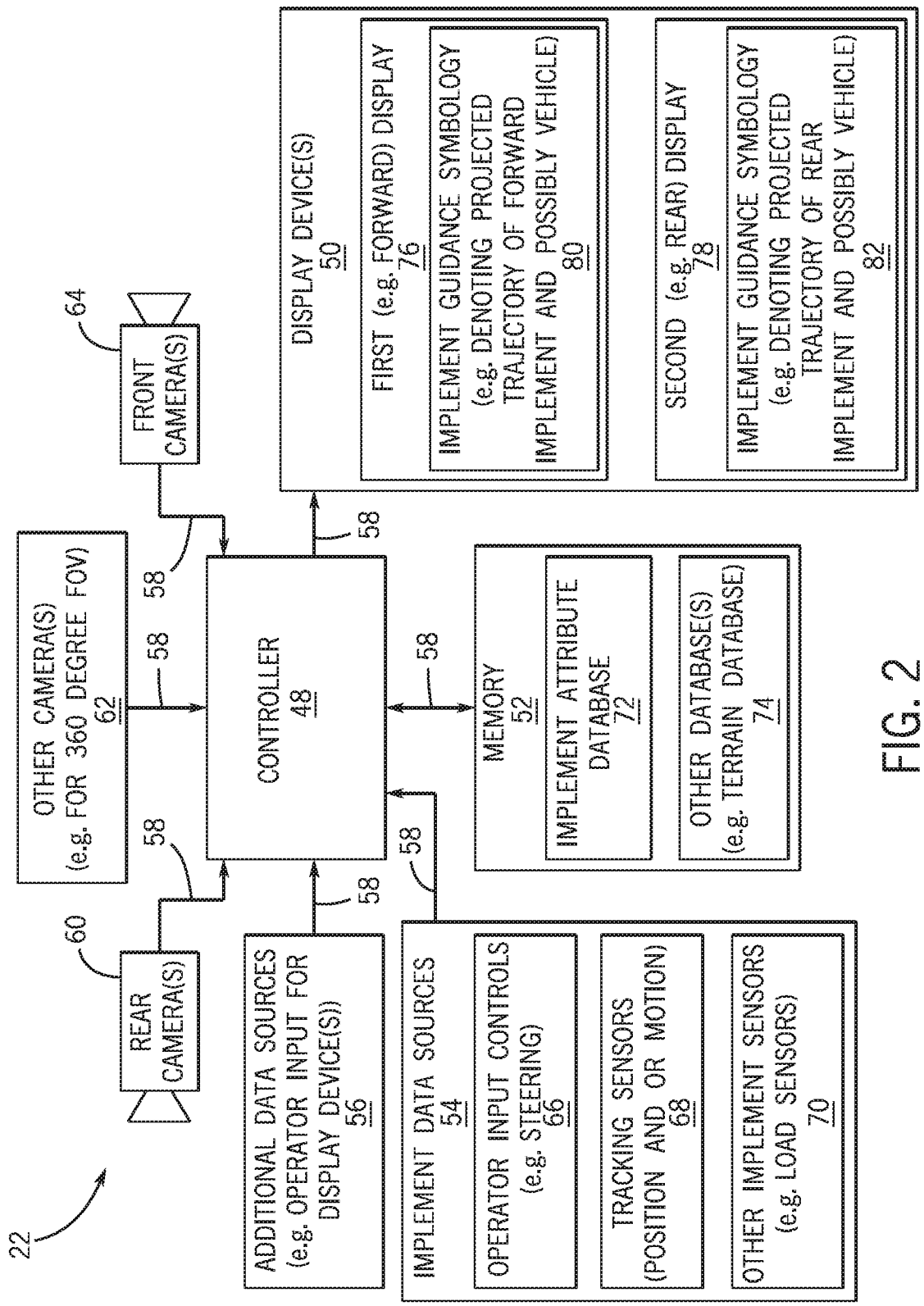
FIG. 2 is a schematic illustrating various components, all or some of which are suitably included in the example implement guidance display system shown in FIG. 1.

Advancing to FIG. 2, several components suitably included in the implement guidance display system 22 (FIG. 1) are illustrated in accordance with an example embodiment of the present disclosure. As schematically shown, the implement guidance display system 22 may include the following components or subsystems, each of which may assume the form of a single device or multiple interconnected devices: (i) a controller 48, (ii) at least one display device 50, (iii) computer-readable storage media or memory 52, (iv) one or more implement data sources 54, and (v) one or more additional data sources 56. The foregoing components can be operably coupled utilizing any suitable combination of wireless or wired (e.g., bus) connections 58. Further, in implementations in which the below-described implement guidance symbology is superimposed over or otherwise visually integrated into a live video feed (or multiple video feeds) of the surrounding environment of the wok implement(s) joined to the loader 20, the implement guidance display system 22 may further include one or more imaging devices 60, 62, 64.

As appearing herein, the term "implement data source" refers broadly to any device, system, or sensor providing data relating to a work implement mounted to a work vehicle. The implement tracking data may include, for example, information pertaining to the present or predicted movement of a work vehicle chassis, as well as the present or predicted movement of a work implement when movable relative to a work vehicle chassis. Thus, utilizing the FEL bale spear attachment 28 mounted to the loader 20 (FIG. 1) as an example, the implement data sources 54 can include the operator input controls 66 utilized to control movement of the tractor chassis 24, such as the below-described steering wheel 88 (see FIGS. 3-5). Additionally, the implement data sources 54 may include operator input controls 66 utilized to control movement of the boom assembly 32, such as the below-described joystick 90 (see again FIGS. 3-5).

The implement data sources 54 may further include one or more implement tracking sensors 68 for monitoring the current orientation, including spatial position and attitude, of the work implement relative to the work vehicle chassis, when the work implement is independently movable relative thereto; e.g., as in the case of the FEL bale spear attachment 28 (FIG. 1) mounted to the front end of the loader 20 by the hydraulically actuated boom assembly 32. The sensors 68 can assume the proximity sensors, displacement sensors (e.g., for measuring hydraulic piston stroke), or any other devices capable of providing data from which the present orientation of a work implement relative to the work vehicle chassis (e.g., the tractor chassis 24) can be ascertained. Furthermore, in certain embodiments, the FOV of one or more imaging devices mounted to the loader 20 may encompass the range of motion of a work implement, such as the FEL bale spear attachment 28 shown in FIG. 1. In such cases, the controller 48 may further perform image analysis of video feed(s) provided by such imaging devices to the present orientation of a work implement (e.g., the FEL bale spear attachment 28) at a given juncture in time. Information regarding past and present orientations of the FEL bale spear attachment 28 (or another independently-movable work implement) may also be tracked, stored in the memory 52, and then recalled from memory 52 by controller 48 as desired.

In more complex embodiments, the controller 48 may consider the present motion state of the work implement in establishing the projected trajectory of the work vehicle implement. In such embodiments, implement tracking sensors 68 may further include sensors for monitoring not only the orientation of the work implement, but sensors for directly monitoring the motion state of the FEL bale spear attachment 28 (or other work implement). In this regard, one or more accelerometers or gyroscopes may be mounted to the FEL bale spear attachment 28 and/or to regions of the boom assembly 32 in embodiments. When present, such sensors may also be utilized to determine the tilt angle the FEL bale spear attachment 28, when this information is utilized by the implement guidance display system 22 in generating the below-described implement guidance symbology. In some embodiments, a multi-axis accelerometer and a multi-axis gyroscope implemented as Microelectromechanical System (MEMS) devices and packaged as, for example, an Inertial Measurement Unit (IMU) may be utilized; e.g., affixed to the FEL bale spear attachment 28 or to the distal end of the boom assembly 32 for capturing such data. Displacement measurements may further be considered over a predetermined time period to determine the motion state of a work implement relative to the work vehicle chassis by monitoring change in positioning over time. Any or all such data may be fed back to the controller 48 on a real-time or near real-time basis and utilized in combination with (or in lieu of) the operator input commands received from the input controls 66 in determining the present orientation and motion state of the FEL bale spear attachment 28 to project the trajectory of the attachment 28. In still other instances, the implement guidance display system may lack such sensors, providing that the present orientation of any independently movable work implements (e.g., the FEL bale spear attachment 28) can be determined by the controller 48 as needed.

Other types of sensors 70, which convey additional data or measurements relating to a given work implement, may further be included in the implement data sources 54 in at least some implementations of the implement guidance display system 22. Such additional implement sensors 70 can include sensors providing data from which the load state of a work implement may be determined; that is, whether the work implement is presented fully loaded, unloaded, or perhaps partially loaded. Various types of implement sensors 70 can be utilized for this purpose including, for example, force sensors measuring the load carried by an implement at a given time, distance measuring equipment for determining when an object is engaged by an implement, and/or imaging devices providing video feeds from which the load state of a work implement can be determined by the controller 48 through image analysis. In other instances, such additional implement sensors 70 may be omitted from the implement guidance display system 22.

With continued reference to FIG. 2, the controller 48 of the implement guidance display system 22 can assume any form suitable for performing the functions described throughout this document. Further, the term "controller," as appearing herein, is utilized in a non-limiting sense to generally refer to the processing architecture of the implement guidance display system 22. The controller 48 can encompass or be associated with one or more processors, control computers, navigational equipment pieces, computer-readable memories (including or in addition to the memory 52), power supplies, storage devices, interface cards, and other standardized components. The controller 48 may also include or cooperate with any number of firmware and software programs or computer-readable instructions designed to carry-out the various process tasks, calculations, and control/display functions described herein.

The memory 52 can encompass any number and type of storage media suitable for storing computer-readable code or instructions, as well as other data utilized to support the operation of the implement guidance display system 22. Further, although illustrated as a separate block in FIG. 2, the memory 52 may be integrated into the controller 48 in embodiments as, for example, a system-in-package, a system-on-a-chip, or another type of microelectronic package or module. In embodiments, the memory 52 may store at least one local database 72, 74 utilized in generating the below-described implement guidance symbology. For example, in certain implementations, the memory 52 may store an implement attribute database 72 containing information pertaining to different implement types, such as critical dimensions, key physical attributes, and/or files containing different graphical depictions of varying types of work implement. As a more specific example, in embodiments in which varying types of work implements can be attached to a work vehicle, as in the case of the loader 20 shown in FIG. 1, the controller 48 may be configured to determine the type of work implement currently attached to the work vehicle and then generate certain implement-specific graphics corresponding to the determined type of work implement, as recalled from the database 72, when generating one or more implement guidance displays. Further discussion of this is provided below. Finally, in certain cases, the memory 52 may also contain other types of database(s) 74, such as a terrain database storing information relating to the topology, key geographical features, and/or terrain type of swaths of land over which the loader 20 may travel. In still other embodiments, the display system 22 may lack any either or both of database(s) 72, 74.

In embodiments of the implement guidance display system 22, the display device 50 may be affixed to the static structure of the operator station 26 and realized in either HDD or HUD configuration. Alternatively, the display device 50 may be freely movable relative to the static structure of the operator station 26; and may assume the form of, for example, a near-to-eye display device or other operator-worn display device. When assuming the form of an operator-worn display device or when assuming the form of a HUD device affixed to the work vehicle operator station 26, the screen of the display device 50 may be fully or partially transparent and the below-described implement guidance symbology may be superimposed on or over the "real-world view" of the environment surrounding a work implement, as seen through the transparent display screen. The term "real-world," as appearing herein, refers to the actual view of the surrounding environment or work area of a work implement, as opposed to a virtual or synthetic recreation thereof. In still further embodiments, the display device 50 can assume the form of a portable electronic display device, such as a tablet computer or laptop, which is carried into the work vehicle operator station (e.g., the operator station 26 of the loader 20) by an operator and which communicates with the various other components of the implement guidance display system 22 over a physical or wireless connection to perform the below-described display functionalities.

During operation, the implement guidance display system 22 generates one or more implement guidance displays 76, 78, each including implement guidance symbology 80, 82, on the display device(s) 50. For example, as schematically indicated in FIG. 2, the implement guidance display system 22 may generate a forward implement guidance display 76 and/or a rear implement guidance display on the display device(s) 50. In some instances, the implement guidance display system 22 may generate the displays 76,78 concurrently. For example, in this case, the implement guidance displays 76,78 may be presented on separate screens of multiple display devices 50 or, instead, on a single screen of one display device 50 in a picture-in-picture or side-by-side format. More commonly, however, the implement guidance display system 22 may generate the implement guidance displays 76, 78 in a mutually exclusive fashion; that is, such that only one of the forward implement guidance display 76 and the rear implement guidance display 78 are presented on the display device(s) a given point in time. In this latter regard, the operator may be permitted to switch between a desired implement guidance display 76, 78 utilizing suitable operator controls, which may be located on or near the display device 50. Alternatively, the controller 48 may automatically select the appropriate guidance display 76, 78, based upon the particular direction in which the work vehicle 20 is presently traveling and/or the particular work implement currently controlled by the operator. Still other types of implement guidance displays may be generated on the display device(s) 50 during operation of the implement guidance display system 22, as further discussed below in connection with FIGS. 7 and 8.

Figure 3:
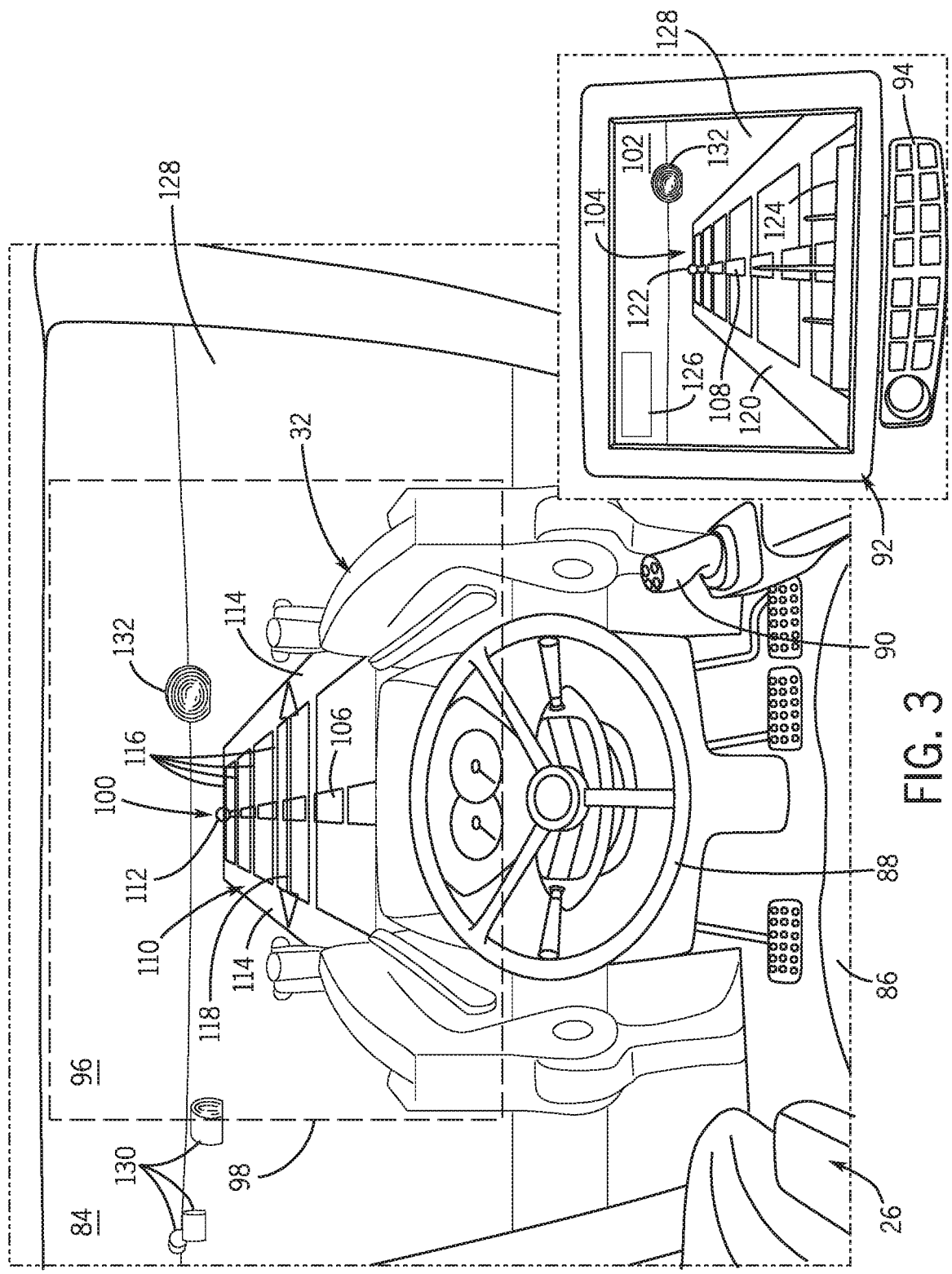
FIGS. 3-5 illustrate a forward implement guidance display as presented on a HUD device (center) and an HDD device or monitor (lower right), either or both of which may be included in the example implement guidance display system of FIG. 2.

Progressing next to FIG. 3, there is shown example forward view from the operator station 26 of the loader 20 when equipped with an embodiment of the display system 22. Here, it can be seen that the loader 20 includes a forward windshield or windscreen 84 through which the environment surrounding the FEL bale spear attachment 28 (hidden from view) can be seen. An operator's seat 86 (partially shown) is located within the operator station 26, positioned behind a steering wheel 88, and located adjacent a joystick 90. An HDD device or monitor 92, as further shown in the bottom right of FIG. 3, may also be located within the operator station 26 of the loader 20 along with various other operator input controls, such as a button cluster 94 found immediately below the monitor 92. In the illustrated example, the implement guidance display system 22 is depicted as generating two different types or formats of implement guidance displays, each including similar implement guidance symbology. The first example implement guidance display is a HUD 96, which is generated on a HUD device represented by dashed box 98 (hereafter, "HUD device 98") and including implement guidance symbology 100. The second example implement guidance display is an HDD 102, which is generated on the monitor 92 (an HDD device) and which likewise includes implement guidance symbology 104.

While two different implement guidance displays (the HUD 96 and the HDD 102) are depicted as concurrently generated in the example of FIG. 3 (and further in FIGS. 4 and 5 discussed below), the implement guidance display system 22 may (and often will) generate only one of the HUD 96 and the HDD 102 in embodiments. The HUD 96 and the HDD 102 are both shown in FIG. 3 for two reasons. First, the HUD 96 and the HDD 102 contain similar symbology and are thus conveniently described together. Second, the illustrated example of the loader 20 including an implement guidance display realized as both a HUD (the HUD 96) and an HDD (the HDD 102) further emphasizes that the implement guidance displays described herein can be generated in various different formats and manners; and, in many instances, may be selectable or customizable by an operator of the loader 20 (or the tractor supplier). The HUD 96 and the HDD 102 are both forward implement guidance displays in the illustrated example and, therefore, each generally correspond to the forward implement guidance display 76 in FIG. 2.

The HUD device 98 may include a transparent screen encompassing at least the dashed box region (the HUD 96) shown in FIG. 3, as perceived by an operator of the loader 20 when seated in the operator seat 86. The transparent screen can be affixed to the static infrastructure within the operator station 26 or, instead, worn by the operator in some manner. In either case, the implement guidance symbology 100 may be generated in a three-dimensional perspective format corresponding to the real-world view through the transparent screen of the HUD device 98. Additional techniques can be utilized, as appropriate, to better integrate or blend the implement guidance symbology 100 into the real-world view seen through the HUD device 98. Such techniques can include masking of certain regions of the implement guidance symbology 100 when intersecting obstacles or geographical features ahead of the loader 20, when such obstacles or geographical features are known to the implement guidance display system 22; e.g., due to the inclusion of distance measuring equipment within the display system 22, inclusion of the terrain topology database 74, or the like.

The symbology included in the implement guidance symbology 100 presented on the HUD 96 will vary between embodiments and can potentially vary in a single embodiment over time depending upon, for example, user customization and/or certain dynamic factors, as discussed below. The following discussion will now focus on the forward view from the loader 20 shown in FIGS. 3-5 and, therefore, movement of the FEL bale spear attachment 28 (FIG. 1) attached to the forward tractor end by the boom assembly 32. The following discussion pertains equally to other types of work implements mounted to the boom assembly 32, such as an FEL bucket, bale squeeze, forklift attachment, or the like, in which case certain graphics and aspects of graphics included in the implement guidance symbology (e.g., the below-described spear tip markers and the width of the below-described projected implement path graphic) will vary accordingly.

In the example of FIG. 3, the implement guidance symbology 100 generated on the example HUD 96 includes at least two primary graphical features or elements: (i) a projected implement path graphic 110, and (ii) a leading spear tip marker 112. The graphic 110 and marker 112 may be more broadly referred to as "implement trajectory symbology" herein as each of these visual elements or graphics are indicative of projected trajectory or path along with the implement under consideration (here, the FEL bale spear attachment 28) is predicted to travel, as determined by the controller 48 of the display system 22 based on the implement tracking data provided thereto. In other instances, different types of implement trajectory symbology may be generated on the implement guidance display in addition to or in lieu of the projected implement path graphic 110 and the leading spear tip marker 112. For example, in certain cases, a symbol or graphic representative of the implement under consideration and presented in a non-obstructive manner (e.g., rendered as partially transparent) may be generated on the HUD 96 (or other implement guidance display) to visually denote a projected future orientation of the implement.

Addressing the graphic 110 appearing on the HUD 96 in greater detail, the projected implement path graphic 110 provides a visual representation of a path along which the implement under consideration (here, the FEL bale spear attachment 28) is forecast to travel by the controller 48. By way of non-limiting example, the projected implement path graphic 110 is imparted with track-like or path-like appearance in the illustrated embodiment. Specifically, the projected implement path graphic 110 is produced to resemble a track or pathway having two forward-extending segments 114, which extend into the distance in a forward direction away from the front end of the loader 20; and a number of horizontally-extending or laterally-extending rungs 116, which extend between forward-extending segments 114. The provision of the rungs 116 provides the viewer with a sense of distance as the rungs 116 becomes shorter in perceived width with increasing distance from the operator station 26, again noting that the projected implement path graphic 110 is generated in perspective (as opposed to isometric) format in this example. The projected implement path graphic 110 thus visually conveys a projected or forecast path that will be traveled by the FEL bale spear attachment 28 for a predetermined distance ahead of the loader 20.

In embodiments, the controller 48 of the display system 22 usefully generates the projected implement path graphic 110 to align with the present orientation of the FEL bale spear attachment 28 for rapid visual association therewith. In this regard, the controller 48 may repeatedly determine a current vertical position of the FEL bale spear attachment 28 (or other work implement) relative to the tractor chassis 24 and then generate or update the HUD 96 to align the implement trajectory symbology (specifically, the projected implement path graphic 110) with the current vertical position of the attachment 28. Additionally, the actual width of the projected implement path graphic 110 (identified in FIG. 3 by double-headed arrow 118) may be substantially equivalent to a maximum width of the FEL bale spear attachment 28 in embodiments; the term "substantially equivalent," as appearing herein, denoting a disparity of less than 10%. Here, the actual width of the projected implement path graphic 110 may be constant over its length (taken in a forward direction) but may appear to grow smaller with increasing distance from the loader 20 as the path graphic 110 is generated in a perspective format. An operator can thus glance at the projected implement path graphic 110 at any point along its length and generally determine the location of the outer edges of the attachment 28, as projected into a future timeframe. This may be useful in increasing operator awareness as to the likely location of the FEL bale spear attachment 28 as the attachment 28 moves along the path identified by the projected implement path graphic 110 to determine if, for example, an outer edge of the attachment 28 is likely to come into close proximity of, or perhaps impact, a nearby obstacle.

As shown in FIG. 3, a graphic 106 representative of the projected trajectory or path of the tractor chassis 24 (herein, the "projected vehicle path graphic 106") can further be generated on the HUD 96 in addition to the projected implement path graphic 110 and/or the leading spear tip marker 112. In the illustrated example, the projected vehicle path graphic 106 assumes the form of a dashed centerline; however, in other implementations, the projected vehicle path graphic 106 may have alternative appearances, such as that of two parallel tracks similar or identical to that shown in FIG. 8. In embodiments, the projected vehicle path graphic 106 and the projected implement path graphic 110 may be graphically projected or mapped onto the same plane, as seen from the perspective of the operator station 26. It will be appreciated, however, that the projected implement path graphic 110 may be graphically projected onto a separate plane, which may be tilted or angled relative to the plane onto which the projected vehicle path graphic 106 is mapped when the FEL bale spear attachment 28 is forecast to move vertically. Alternatively, the projected implement path graphic 110 may be graphically projected or mapped onto a plane extending parallel to the plane onto which the projected vehicle path graphic 106 is mapped when the FEL bale spear attachment 28 resides at a different (e.g., raised) vertical position, but is not forecast to move vertically by the controller 48 of the display system 22. In other embodiments, the projected vehicle path graphic 106 may be visually integrated into the HUD 96 in another manner (e.g., by mapping onto the topology of the terrain if known) or omitted from the HUD 96 altogether.

Discussing next marker 112, the leading spear tip marker 112 visually indicates the projected location of the leading tip of the longest spear or spears (here, the central spear) included in the FEL bale spear attachment 28 when the FEL bale spear attachment 28 reaches the far terminal end (the distal end) of the path represented by the projected implement path graphic 110. In other embodiments, additional spear tip markers (perhaps, having a varied, less pronounced appearance) may be generated by the display system 22 to call-out the projected future locations of the other spear tips included in the FEL bale spear attachment 28. Generally, the provision of the leading spear tip marker 112 may draw operator attention to the center position of the FEL bale spear attachment 28 when reaching the end of its projected path of travel; and, more importantly, may assist the operator in better visualizing the future location at which this key physical feature of the FEL bale spear attachment 28 is predicted to arrive given the present set of conditions governing implement navigation. Again, such conditions may include the present vertical position of the FEL bale spear attachment 28 relative to the tractor chassis 24, any operator input commands currently received controlling movement of the tractor chassis 24 or the boom assembly 32, and/or (in at least some embodiments) any data received by the controller 48 describing the current motion state of the attachment 28 and/or tractor chassis 24. Further, if the topology of the surrounding terrain is known (e.g., from data stored in the database 74) or can be measured by sensors aboard the loader 20, this information may also be considered in establishing the predicted trajectory of the FEL bale spear attachment 28 and, therefore, in positioning the leading spear tip marker 112 (and in generating the projected implement path graphic 110) on the HUD 96.

In certain embodiments, vertical displacement between the leading spear tip marker 112 and the distal terminal edge of the projected implement path graphic 110 (that is, the edge of the graphic 110 furthest the viewer in perspective) may denote changes in the tilt angle of the FEL bale spear attachment 28. For example, as the tilt angle of the FEL bale spear attachment 28 pitches in an upward direction such that the tip of the leading bale spear included in the attachment 28 rotates toward an upright attitude (in a counterclockwise direction in FIG. 1), the leading spear tip marker 112 may move upwardly relative to the distal terminal edge of the projected implement path graphic 110, perhaps in proportion to the change in tilt angle. In other embodiments, a numerical readout or other graphic may be presented indicating the tilt angle of the FEL bale spear attachment 28 (or other work implement attachment to the loader 20). As a still further possibility, the implement guidance display system 22 may omit the leading spear tip marker 112 or any other graphic indicating the tilt angle of the FEL bale spear attachment 28.

The present example notwithstanding, the symbols or graphics constituting the implement guidance symbology 100 will vary between embodiments. Accordingly, the general appearance of the projected implement path graphic 110 and the leading spear tip marker 112 (if present) may differ in alternative embodiments; and, in certain cases, the appearance of these graphics may be customizable by the operator (or the tractor supplier) utilizing a suitable control or programming interface. Any or all of the graphical features making-up the implement guidance symbology 100 may also be generated in a partially transparent format (less than 100% opacity) in embodiments to avoid visually obstructing the view of the work area surrounding the FEL bale spear attachment 28. Different color coding schemes and animation effects may also be applied to the implement guidance symbology 100, as desired. An operator may also be permitted turnoff or deactivate the implement guidance symbology 100 in certain embodiments.

Discussing next the HDD 102 shown in the lower right of FIG. 3, the illustrated HDD 102 includes various implement guidance symbology 104 corresponding to the implement guidance symbology 100 shown in the above-described HUD 96 generated on HUD device 98. A does the HUD implement guidance symbology 100, the HDD implement guidance symbology 104 includes a projected implement path graphic 120 and a spear tip marker 122 (more broadly, "implement trajectory symbology 120, 122"). As was previously the case, the projected implement path graphic 110 visually denotes a predicted or forecast path traveled by the FEL bale spear attachment 28 (or another implement attached to the front end of the loader 20) as the loader 20 moves or continues to move in a forward direction. Similarly, the leading spear tip marker 112 may identify the location at which the leading tip of the longest, central spear projecting from the FEL bale spear attachment 28 is projected to arrive when the FEL bale spear attachment 28 reaches the end of the forecast path represented by the projected implement path graphic 120. The other description set-forth above with respect to the projected implement path graphic 110 and the leading spear tip marker 112 further applies equally to the projected implement path graphic 120 and the leading spear tip marker 122 of the HDD 102, respectively. Also, if desired, a projected vehicle path graphic 108 (analogous to the projected vehicle path graphic 108 appearing on the HUD 96) can further be generated on the HDD 102 in addition to or in lieu of the projected implement path graphic 120 and the leading spear tip marker 112.

A live imaging device feed is presented on the screen of the HDD 102, as captured by a forward-looking imaging device mounted to the loader 20; e.g., the front imaging device 64 identified in FIG. 2. The projected implement path graphic 120 and the leading spear tip marker 122 are thus overlaid or superimposed over this live video feed, while being presented in a three-dimensional perspective format corresponding to the real-world environment captured by the video feed. In the example of FIG. 3 in which the FEL bale spear attachment 28 is not captured by the imaging device FOV presented on the HDD 102, a graphical representation or depiction 124 of the implement (hereafter, "implement graphic 124") is further presented on a lower portion of the HDD 102 to represent the FEL bale spear attachment 28. The implement graphic 124 may be moved vertically along the HDD 102, perhaps while generated in a partially transparent format or generated as a smaller, less obstructive graphic, as the FEL bale spear attachment 28 is raised or lowered to indicate the current position of the FEL bale spear attachment 28 relative to the tractor chassis 24. The near or proximal edge of the projected implement path graphic 110 may likewise move along with the implement graphic 124, as appropriate. In other embodiments, the implement graphic 124 may not move to avoid visually obstructing the implement guidance HDD 102, while only the proximal edge of the projected implement path graphic 110 moves vertically in accordance with the current height of the FEL bale spear attachment 28 relative to the tractor chassis 24 (or to the ground). Finally, a textual annunciation or readout 126 may be further provided to identify the type of display currently presented on the HDD 102, as may be useful when the operator is permitted to switch between the presentation of different types of implement guidance displays on the HDD 102 in the manner described below.

In the example scenario shown in FIG. 3, the FEL bale spear attachment 28 currently resides in the home orientation (the non-tilted, lowered position) shown in FIG. 1. Further, at this juncture in time, operator input commands have not been received requesting variance in the orientation of the FEL bale spear attachment 28 relative to the tractor chassis 24 or attempting to turn the loader 20 from a straight path. Consequently, the loader 20 is either presently traveling in a purely forward direction along a straight path; or is presently stationary but will travel forward along a straight path if commanded or permitted to accelerate in a forward direction. It can further be seen in the example of FIG. 3 that the loader 20 is located on a field 128 across which a number of hay bales 130, 132 are distributed. For the purposes of the following discussion, it is assumed that the operator of the loader 20 wishes to secure the hay bale 132 for transport utilizing the FEL bale spear attachment 28.

Figure 4:
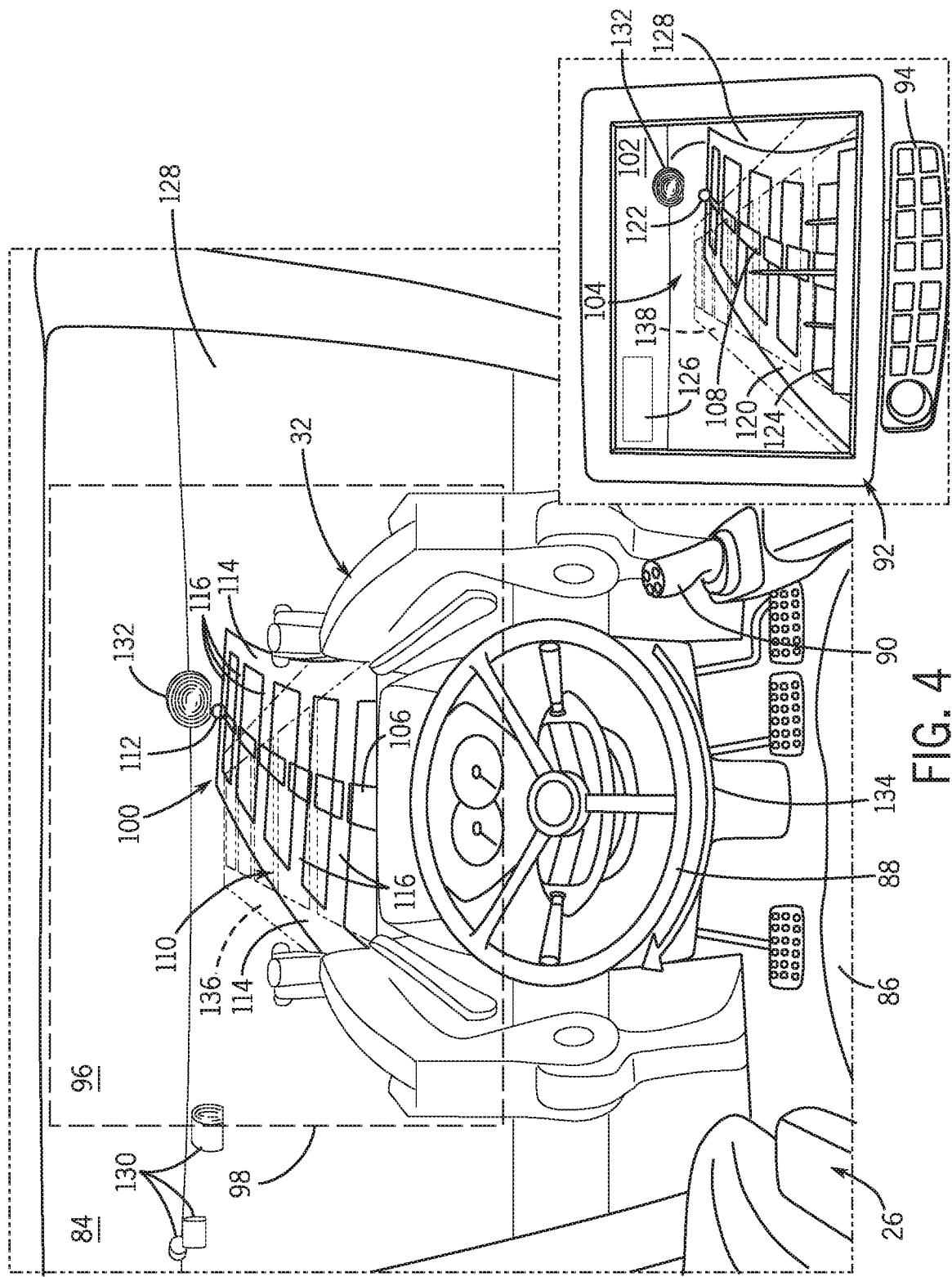

By glancing at the implement guidance symbology 110 on the HUD 96 or the implement guidance symbology on the HDD 102, as shown in FIG. 3, the operator can easily determine that the loader 20 should be turned to the right by some amount when traveling forward toward the hay bale 132 to properly engage the FEL bale spear attachment 28 into the targeted bale 132. Thus, the operator may turn the steering wheel 88 to place the FEL bale spear attachment 28 on a trajectory intersecting the targeted hay bale 132. As shown in FIG. 4 (wherein an arrow 134 indicates turning of the steering wheel 88), this results in a corresponding bending of the projected implement path graphic 110 on the HUD 96 and the projected implement path graphic 120 on the HDD 102. By reference to the either or both of the graphics 110, 120, the operator can quickly determine whether the steering angle input is appropriate to place the FEL bale spear attachment 28 on a course intersecting the targeted hay bale 132, iteratively adjusting the steering wheel angle as needed. Further, the operator may further visually reference either or both of the leading spear tip markers 112, 122 to determine if the central spear of the FEL bale spear attachment 28 is properly aligned with the center or centerline of the targeted hay bale 132 such that this spear may engage into a central portion of the hay bale 132 as the loader 20 progresses forward. In this manner, the implement guidance symbology 100, 104 provides an intuitive guidance cue enabling an operator to navigate the FEL bale spear attachment 28 into engagement with the targeted hay bale 132 in a reliable and precise manner.

In the example shown in FIG. 4, the controller 48 of the implement guidance display system 22 further generates a baseline or "zero deviation" implement path graphic 136 on the HUD 96, as well as a zero deviation implement path graphic 138 on the HDD 102. The zero deviation implement path graphics 136, 138 each indicate the trajectory of the FEL bale spear attachment 28 when in a predetermined home orientation (the lowered, near-ground position) and traveling a straight (zero deviation) path in a forward direction. A visual contrast is thus created between the zero deviation implement path graphics 136, 138 and the projected implement path graphics 110, 120 to visually emphasize or highlight the degree to which the projected implement path graphics 110, 120 diverge from the zero deviation path, whether by turning of the loader 20 (as shown in FIG. 4) or by vertical movement of the FEL bale spear attachment 28 (as shown and discussed below in conjunction with FIG. 5). When generated on either or both of the HDD 102 and HUD 96, the zero deviation implement path graphics 136, 138 may be generated in a different color than the projected implement path graphics 110, 120, rendered partially transparent (e.g., to resemble a shadow or ghost image), or otherwise imparted with a varied appearance to provide contrast with the graphics 110, 120 and to avoid visually cluttering the depicted implement guidance displays.

Figure 5:
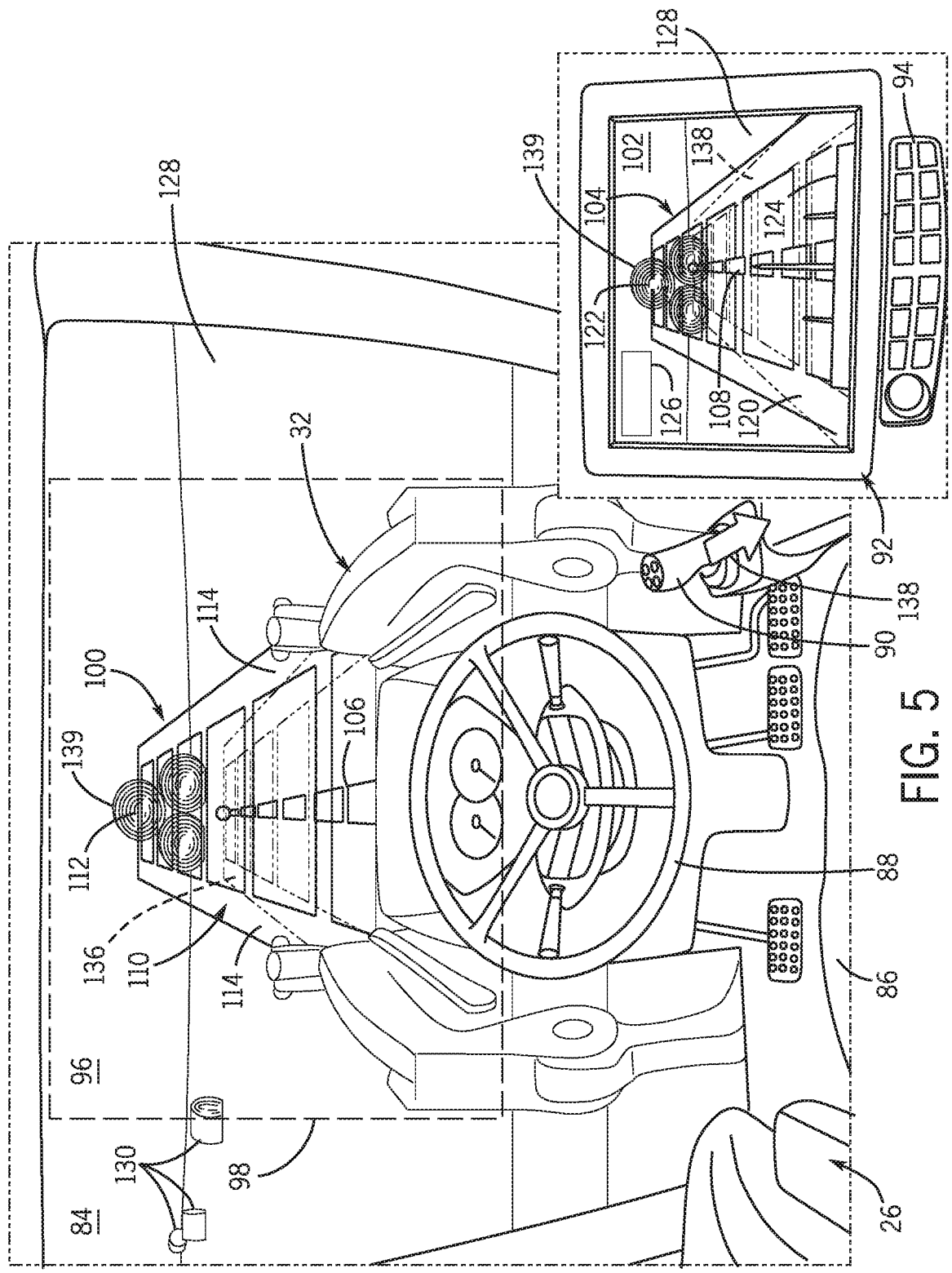

Turning next to FIG. 5, a further example scenario is illustrated in which the operator of the loader 20 desires to engage the FEL bale spear attachment 28 into the uppermost hay bale 139 included in a stack of hay bales present on the field 128. Accordingly, the operator may command the boom assembly 32 to raise the FEL bale spear attachment 28 to an elevation generally matching that of the uppermost hay bale 139; e.g., by moving the joystick 90 in toward the body of the operator in the manner indicated by arrow 138 in FIG. 5. Upon receipt of this operator input command, the controller 48 varies the projected implement path graphics 110, 120 accordingly such that the far end or distal end of the path represented by the graphics 110, 120 is lifted to an increased elevation as compared to the near end or proximal end of the path represented by the graphics 110, 120. The degree to which the distal end of the path represented by the graphics 110, 120 may depend upon the displacement of the joystick 90; the length of the projected path represented by graphics 110, 120; and possibly other factors (e.g., the inclination of topology of the terrain ahead of the loader 20 if known to the display system 22). Additionally, the leading spear tip markers 112, 122 are also positioned to indicate the corresponding vertical change in the predicted position of the central spear of the FEL bale spear attachment 28 when arriving at the terminal end of the path represented by the graphics 110, 120. An operator can thus visually reference the implement guidance symbology 100 generated on the HUD 96 and/or the implement guidance symbology generated on the HDD 102 to guide the FEL bale spear attachment 28 into engagement with the targeted hay bale 132 in a reliable and precise manner.

There has thus been described one manner in which the example implement guidance display system 22 can produced unique symbology on an implement guidance display, whether generated as HUD or an HDD, to assist an operator of work vehicle in navigating a work implement in an intended manner. In the above-described example, the implement guidance displays are generated in a forward-looking, three-dimensional perspective format; however, in further embodiments, the display system 22 may generate other types of implement guidance display(s) in addition to or in lieu of such forward-looking, three dimensional displays. For example, in certain instances, the implement guidance display system 22 may further generate a rear implement guidance display as described below in connection with FIG. 6.

Figure 6:
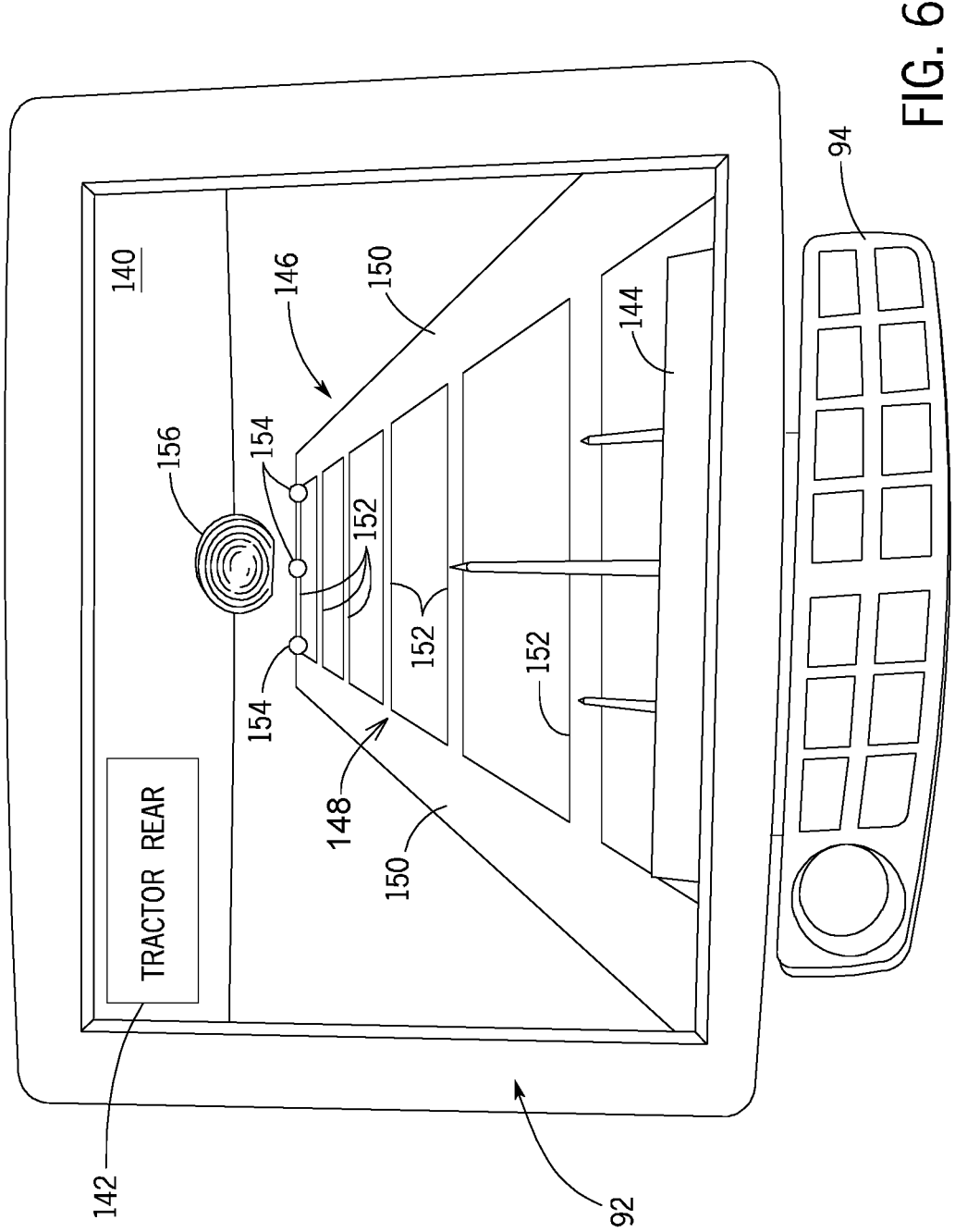
FIG. 6 illustrates a rear implement guidance display, as presented on the monitor shown in FIG. 5, which may be selectively generated by the example implement guidance display system in addition to or in lieu of the forward implement guidance display shown in FIGS. 3-5.
Figure 7:
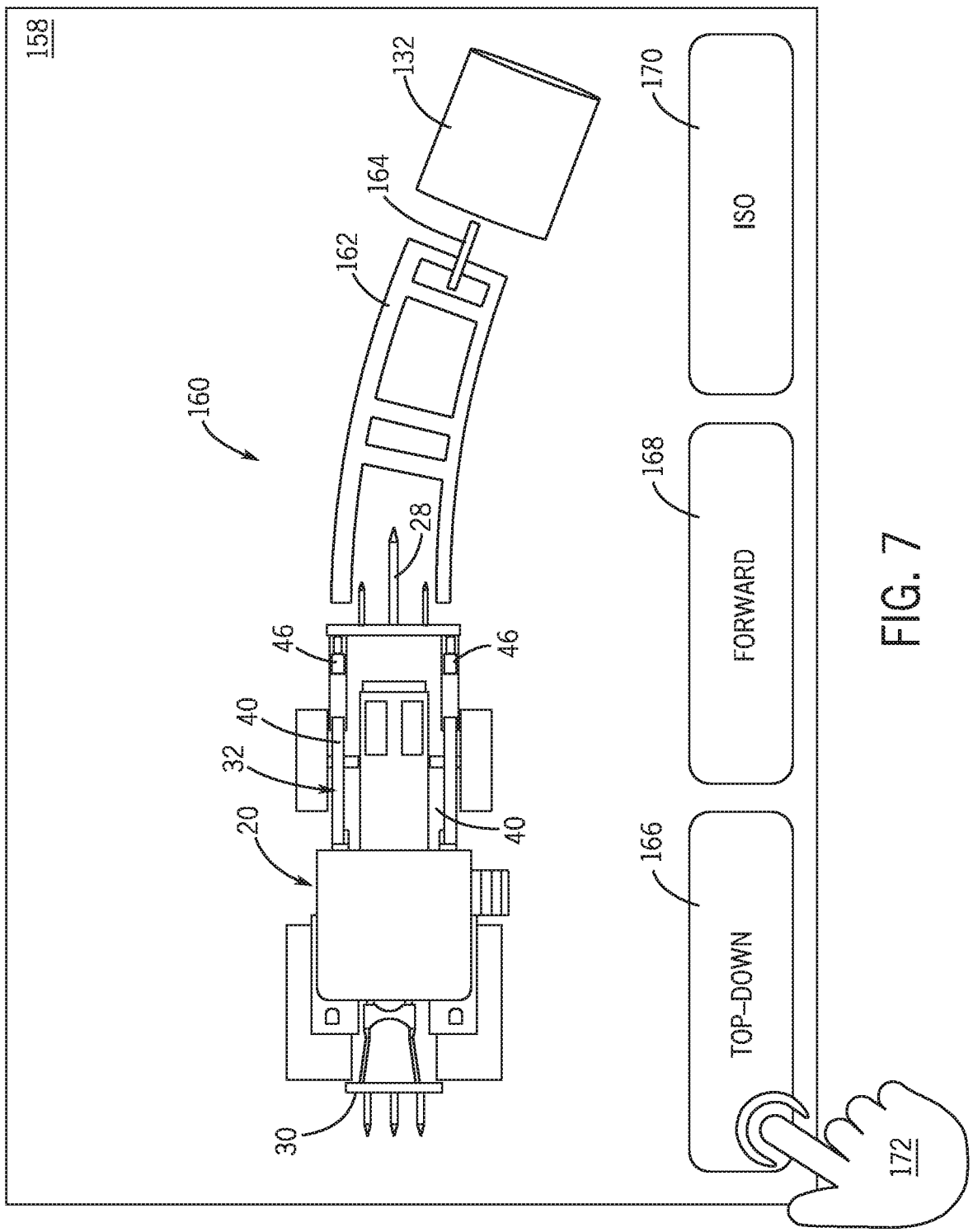
FIGS. 7 and 8 illustrate top-down and isometric implement guidance displays, respectively, which may be generated by the example implement guidance display system in addition to or in lieu of the implement guidance displays shown in FIGS. 3-6.
Figure 8:
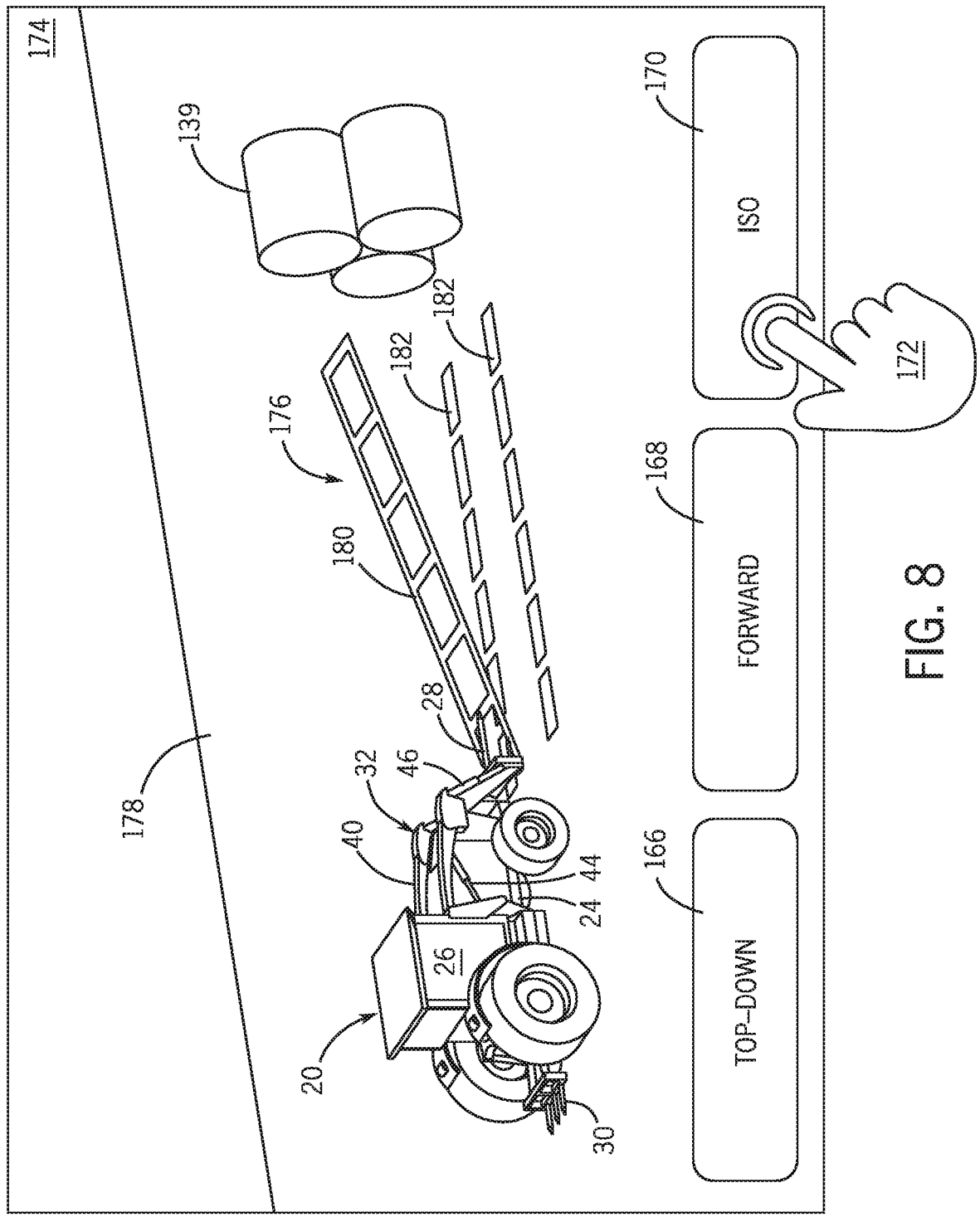

Turning to FIG. 6, a rear implement guidance display 140 may be generated on the monitor 92 by the implement guidance display system 22 in embodiments. Here, a live video feed of the area to the rear or aft of the loader 20 is captured by one or more imaging devices (e.g., by the rear camera 60 in FIG. 2) and presented on the monitor 92. A text annunciation or readout 142, as appearing in the upper left region of rear implement guidance display 140, indicates that a tractor rear view is currently displayed on the monitor 92. Once again, an implement-specific graphic 144 is produced representative of a depiction of the work implement under consideration; here, the rear bale spear attachment 30 shown in FIG. 1. Implement guidance symbology 146 is further generated on the rear implement guidance display 140 and includes: (i) a projected implement path graphic 148 (including forward-extending segments 150 and laterally-extending rungs 152, as previously described), and (ii) a number of spear tip markers 154. In this example, three spear tip markers 154 are generated on the implement guidance HDD 140 as the rear bale spear attachment 30 includes three leading bale spears, the markers 154 generated to have an appropriate positioning and spacing corresponding to the real-world work implement. The spear tip markers 154 thus identify the projected future orientations of the bale spears of spear attachment 30 when the reaching the distal edge of the projected implement path represented by the graphic 148. In other embodiments, the projected implement path graphic 148 or the spear tip markers 154 may be omitted from the rear implement guidance display 140. Once again, by glancing at the rear implement guidance display 140, an operator can determine if the projected path of the rear implement (the rear spear attachment 30) is on an appropriate trajectory to engage the chosen target, such as the hay bale 156 shown to the rear of the loader 20 in FIG. 6.

During operation, embodiments of the implement guidance display system 22 usefully permit an operator of the loader 20 to switch between presentation of the forward implement guidance display (e.g., the HDD 102 shown in FIGS. 3-5) or the rear implement guidance display (e.g., the HDD 140 shown in FIG. 6) on the monitor 92. The operator input switching between these (and possibly other) implement guidance displays can be received in various different manners. For example, such operator input may be received via touch input with the monitor 92 (if possessing touchscreen capabilities), by interaction with the button cluster 94 below the monitor 92, or via interaction with another operator input device located within the operator station 26 of the loader 20 (generically represented by input controls 66 in FIG. 2). In other instances, the controller 48 of the display system 22 may automatically select the appropriate guidance display 76, 78 to present on the monitor 92 at a given juncture in time based upon the particular direction in which the work vehicle 20 is presently traveling and/or the particular work implement currently controlled by the operator.

Still other types of implement guidance displays may be generated on the display device(s) 50 during operation of the implement guidance display system 22. For example, and referring now to FIG. 7, the implement guidance display system 22 may further generate a horizontal situation or top-down implement guidance display 158 including implement guidance symbology 160 in at least some embodiments. When generated, such a top-down implement guidance display 158 may depict the surrounding environment of the loader 20 (or other work vehicle). The surrounding environment of the loader 20 may be virtually represented on a monitor or display device in embodiments, potentially while rendering certain terrain features (e.g., terrain type and geographical features) in accordance with data stored in the terrain database 74 (if present). Alternatively, when the tractor is equipped with multiple imaging devices 60, 62, 64 providing multiple imaging device feeds which a 360 degree view of the surrounding environment of the loader 20 can be combined or "stitched together," a top-down implement guidance display 158 may be generated to include a live video feed of the surrounding environment. For consistency with the previous examples, the implement guidance symbology 160 is again generated to include a projected implement path graphic 162 and a spear tip marker 164 of the type previously described in conjunction with FIGS. 3-6. Further, the example in FIG. 7 generally corresponds with the example shown in FIG. 4 in which the loader 20 is steered by an operator to turn toward the targeted hay bale 132. Thus, again, the operator may visually reference the implement guidance symbology 160 shown in FIG. 7 to ensure that the FEL bale spear attachment 28 is properly engaged into the hay bale 132 as loader 20 progresses forward.

An operator may switch between presentation of the top-down implement guidance display 158 and other available implement guidance display utilizing any suitable user interface. For example, as further indicated in FIG. 7, three virtual buttons 166, 168, 170 may be presented and selected by an operator when desired utilizing, for example, cursor device or via touch input (represented by touch icon 172). In a further exemplary scenario, an operator may select display of an isometric view by selection of the button 170 shown in the lower right corner of the implement guidance display 158. Such input thus summons an isometric implement guidance display, such as the isometric implement guidance display 174 shown in FIG. 8. Here, the implement guidance display 174 includes implement guidance symbology 176, which is situated in a virtual or synthetic three-dimensional environment surrounding a graphical depiction of the loader 20. The terrain 178 within the syntenic environment may be generated to have a flat topology, as shown; or, instead, may be generated to conform to the topology of the real-world terrain surrounding the loader 20, if such topology is known to the display system 22 from information stored in the database 74 or in some other manner. The implement guidance symbology 176 is once again generated to include a projected implement path graphic 180, as previously described. Additionally, in the example of FIG. 8, a projected vehicle path graphic 182 is further generated to visually denote the projected trajectory of the tractor chassis 24. In this example, the projected vehicle path graphic 182 is generated to appear as two parallel tracks (e.g., represented by dashed lines) having a predetermined lateral spacing, which may or may not correspond to a maximum width of the loader 20. An operator may thus reference the implement guidance symbology 176 to control movement of the tractor chassis 24 and the boom assembly 32 to ensure that the FEL bale spear attachment 28 properly engages into the targeted hay bale 139 (corresponding to the example of FIG. 5) as the loader 20 moves forward toward the illustrated hay bale stack.

Figure 9:
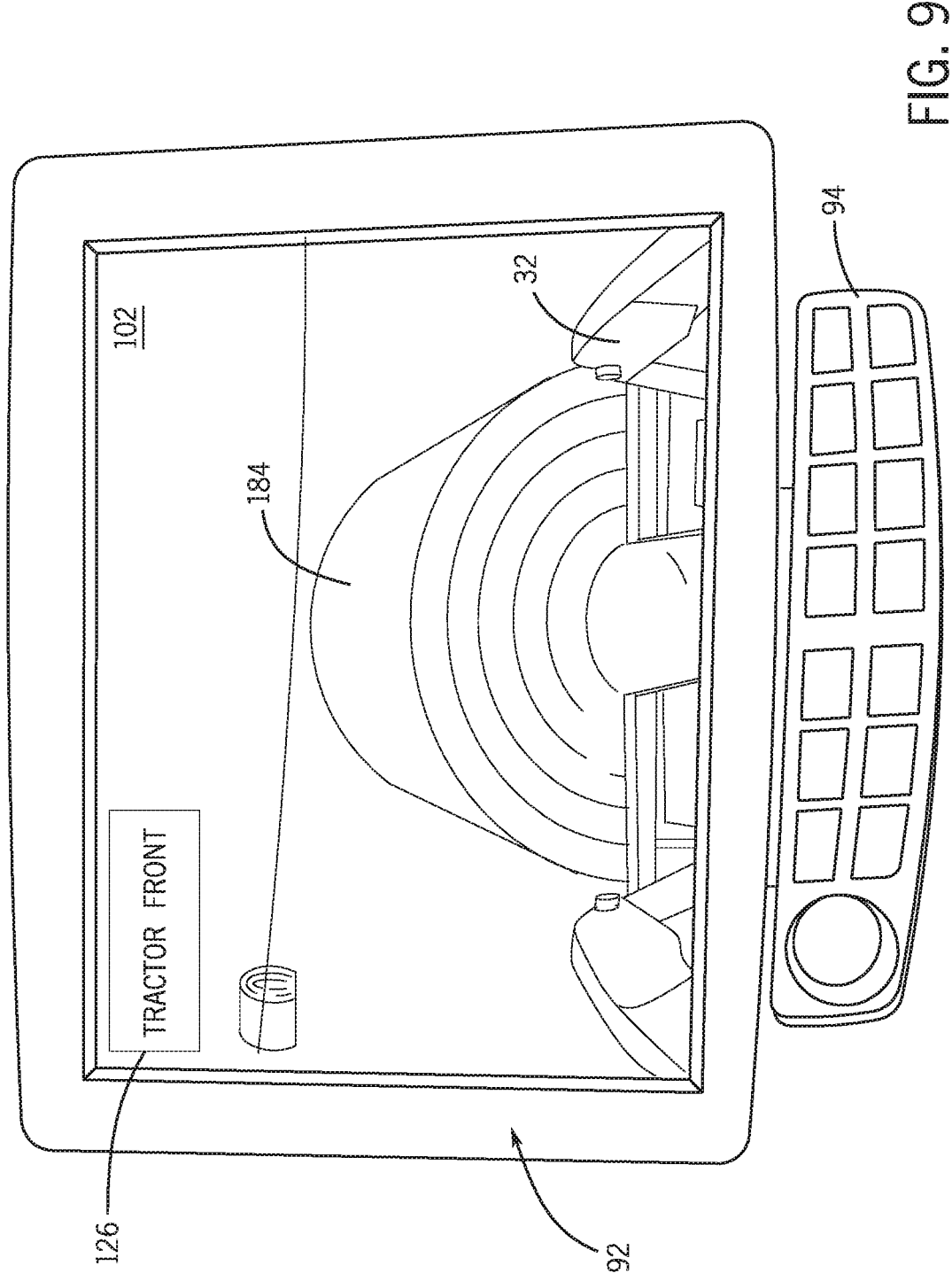
FIG. 9 illustrates a forward implement guidance display, as generated on the monitor shown in FIGS. 3-5, in an example scenario in which the implement guidance symbology is temporarily suppressed or hidden, while the work implement under consideration (here, an FEL bale spear attachment) is in a loaded state.

In certain embodiments, the controller 48 of the implement guidance display system 22 may be configured to determine when a work implement is in a loaded state; and, when so determining, suppress display of at least a portion of the implement trajectory symbology. Consider, for example, the example scenario shown in FIG. 9 in which the FEL bale spear attachment 28 now carries a hay bale 184. Here, the controller 48 has determined that the FEL bale spear attachment 28 is loaded based upon, for example, data provided by the implement sensors 70 shown in FIG. 2. In response to this determination, the controller 48 temporarily suppresses the display of the implement guidance symbology on the relevant implement guidance display(s). In the example of FIG. 9, specifically, the controller 48 suppresses display of the implement guidance symbology 104 generated on the HDD device or monitor 92 shown in FIGS. 3-5. In a similar regard, the controller 48 may suppress display of the implement guidance symbology 100 normally presented on the HUD 96 when determining that the FEL bale spear attachment 28 is in a loaded state. This may help declutter the display screen when such implement guidance symbology is unneeded or less helpful. In further embodiments, the controller 48 may not suppress display of the implement guidance symbology (and, perhaps, may otherwise alter the appearance of the implement guidance symbology) when determining that the implement under consideration is in a loaded or partially loaded state.

Finally, in certain embodiments, the controller 48 of the implement guidance display system 22 may be configured to identify an implement type corresponding to the work implement; and then further generate, on the display device 50, graphics representative of the identified implement type. Such graphics may be recalled from the implement attribute database 72 by the controller 48 based upon the identified implement type, with the database 72 potentially correlating such implement-specific information utilizing a multi-dimensional lookup table or any other suitable data structure. Considering the graphical depictions 124, 144 shown on the HDD monitor 92 (FIGS. 3-5) as an example, the controller 48 may alter the graphical depictions 124, 144 utilizing the data stored in the database 72 when a different work implement is attached to the loader 20. The controller 48 may determine the particular implement type currently attached to the loader 20 by sensing a tag (e.g., a radio frequency identification tag) or reading other identifying information present on the implement, by visual analysis of a imaging device feed capturing the implement, from operator input specifying the type of implement currently attached to the loader 20 (e.g., as selected from a drop-down menu or another graphical user interface element), or utilizing any other technique. The controller 48 may also utilize the information stored in the database 72 is generating other symbols or graphics included in the implement guidance symbology in embodiments. For example, the controller 48 may reference the database to determine the appropriate width to assign the projected implement path graphic based upon a maximum width of the implement, as stored in the database 72. Similarly, if markers designating the predicted future location of key physical features of an implement (e.g., the above-described spear tip markers) are presented on the implement guidance display, the controller 48 may further recall information defining the graphics and appropriate locations for usage in generating such markers, as previously described in connection with FIGS. 3-6.

Figure 10:
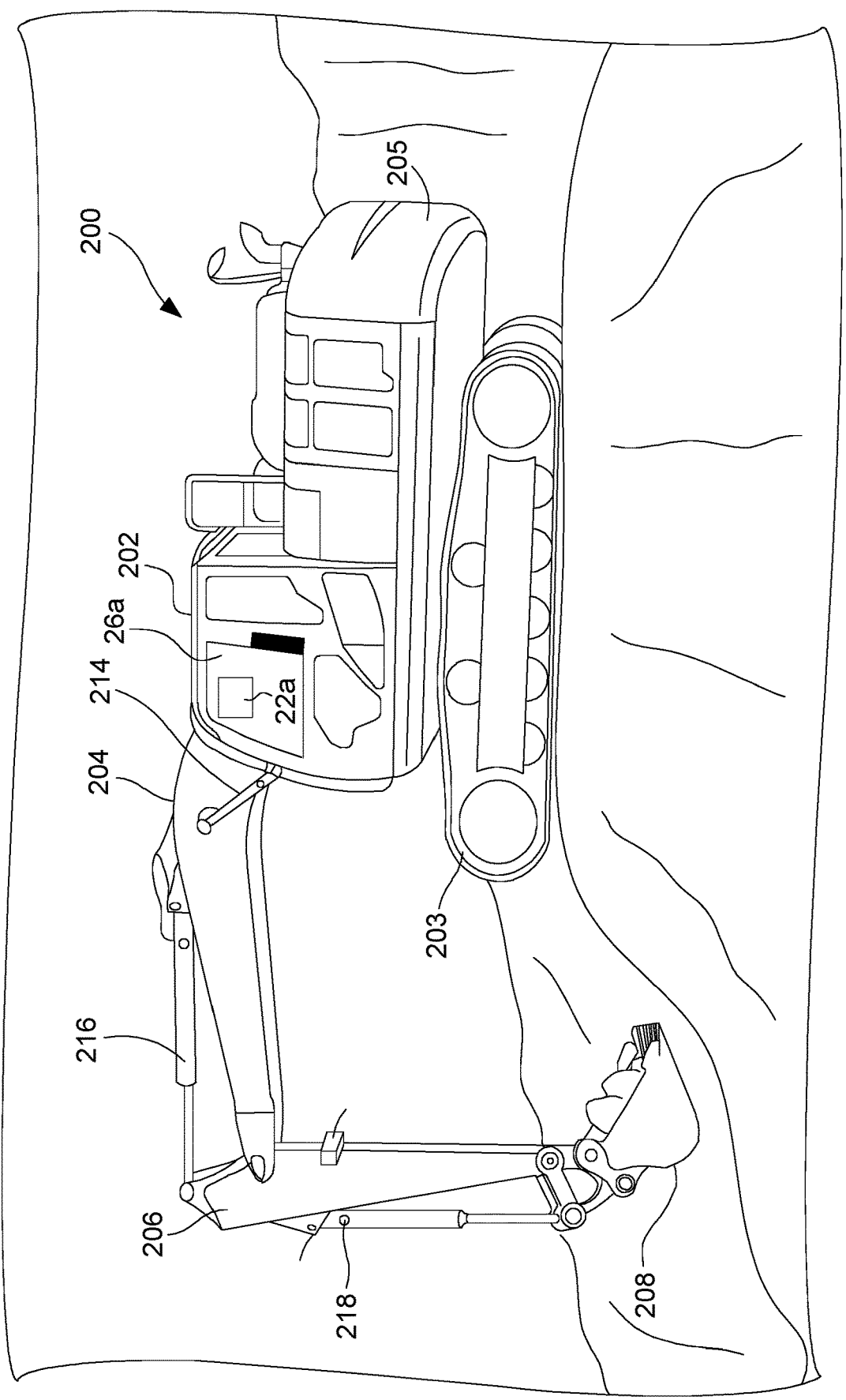
FIG. 10 is a side view of an example work vehicle (here, an excavator) equipped with an embodiment of a guidance display system according to this disclosure.

Example of a Work Vehicle Having One or More
Static and Dynamic Dimensions and Equipped with
a Guidance Display System FIG. 10 is a side view of a work vehicle 202 (here an excavator) in a worksite 200 equipped with an embodiment of the guidance display system, as generically represented by display system 22a and discussed more fully below in connection with FIGS. 10-14B. Work vehicle 202 includes ground engaging elements 203 (e.g. tracks), boom 204, house (or chassis) 205, stick 206, and bucket 208. Ground engaging elements 203 engage a surface of worksite 200 to drive and direct motion of work vehicle 202 across worksite 200. House 205 is rotatably coupled to ground engaging elements 203 and typically houses the frame, an engine, transmission, hydraulic pumps, an operator station 26a, controls for controlling work vehicle 202, etc. Boom 204 is coupled to house 205 at a linkage point that allows movement of boom 204 relative to house 205. Boom 204 is actuated by an actuator 214. Stick 206 is coupled to boom 204 at a linkage point that allows movement of stick 206 relative to boom 204 by an actuator 216. Bucket 208 is coupled to stick 206 at a linkage point that allows movement of bucket 208 relative to stick 206 by an actuator 218. An operator can command the house 205 to rotate about a vertical axis relative to tracks 203 and thus also move the boom 204 in a circle about the same vertical axis. The operator may control the actuators 214, 216, 218 to extend and retract, as desired, through movement of a suitable control interface (e.g., a joystick) located within the operator station 26a on house 205 of the work vehicle 202.

Figure 11:
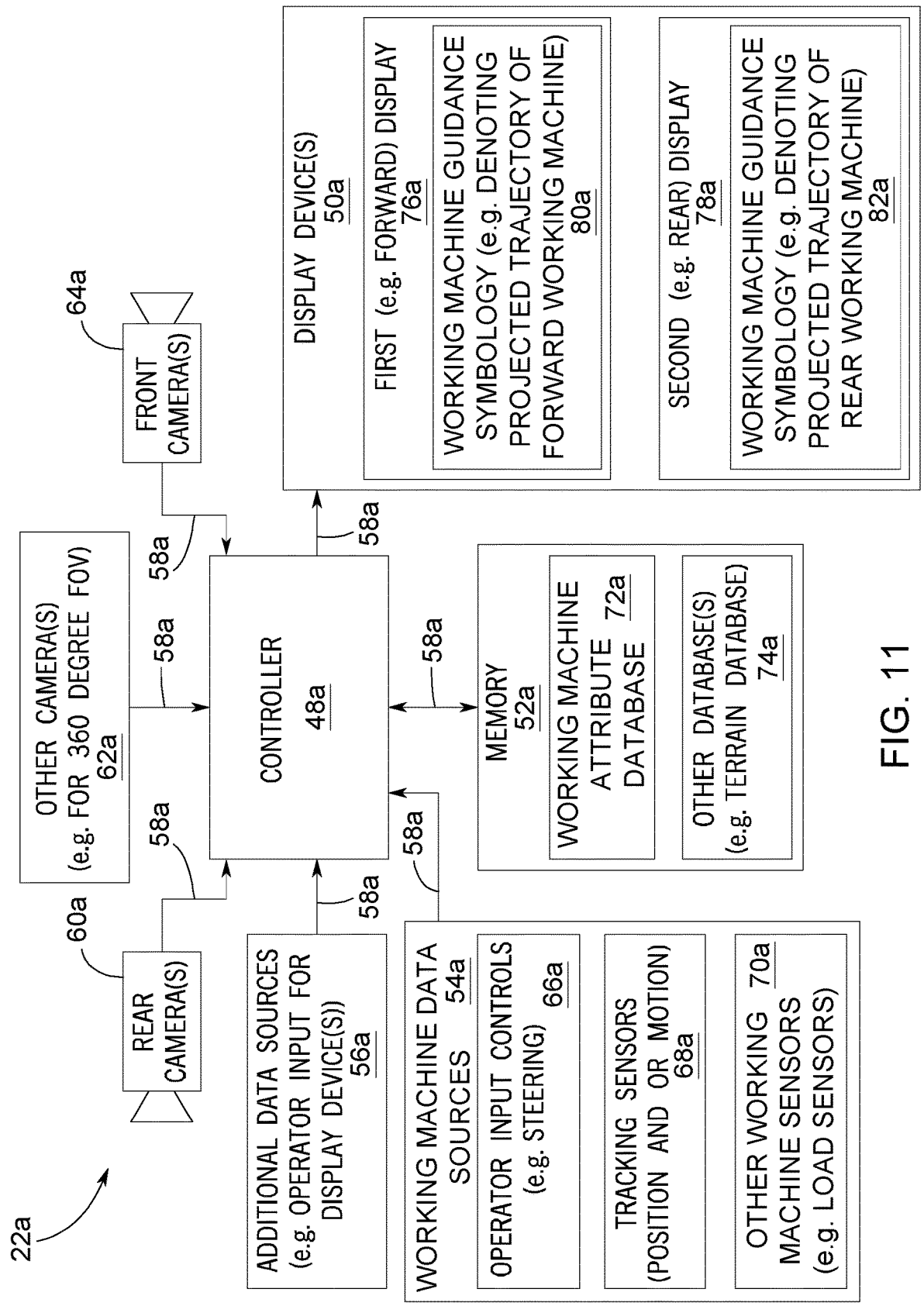
FIG. 11 is a schematic illustrating various components, all or some of which are suitably included in the example display system shown in FIG. 1.

Advancing to FIG. 11, several components suitably included in the display system 22a (FIG. 10) are illustrated in accordance with an example embodiment of the present disclosure. As schematically shown, the display system 22a may include the following components or subsystems, each of which may assume the form of a single device or multiple interconnected devices: (i) a controller 48a, (ii) at least one display device 50a, (iii) computer-readable storage media or memory 52a, (iv) one or more work vehicle data sources 54a, and (v) one or more additional data sources 56a. The foregoing components can be operably coupled utilizing any suitable combination of wireless or wired (e.g., bus) connections 58a. Further, in implementations in which the below-described display symbology is superimposed over or otherwise visually integrated into a live video feed (or multiple video feeds) of the surrounding environment of the implements joined to the work vehicle 202, the display system 22a may further include one or more imaging devices 60a, 62a, 64a.

As appearing herein, the term "work vehicle data source" refers broadly to any device, system, or sensor providing data relating to the work vehicle or implements of the work vehicle. The work vehicle tracking data may include, for example, information pertaining to the present or predicted movement of the work vehicle, as well as the present or predicted movement of the work vehicle 202. Thus, utilizing FIG. 10 as an example, the work vehicle data sources 54a can include the operator input controls 66a utilized to control movement or steering of the work vehicle 202 (e.g., steering wheel, foot pedals, hand controls or a joy stick). Additionally, the work vehicle data sources 54a may include operator input controls 66a utilized to control movement of an implement such as the boom 204 (e.g., steering wheel, foot pedals, hand controls or a joy stick).

The work vehicle data sources 54a may further include one or more work vehicle tracking sensors 68a for monitoring the current orientation, including spatial position and attitude, of the work vehicle chassis alone or in conjunction with the current orientation of tracks 203. The work vehicle data may also monitor the current orientation of an implement, when the implement is independently movable relative thereto; e.g., as in the case of the boom 204 of excavator 202. The sensors 68a can assume the proximity sensors, inertial measurement unit, displacement sensors (e.g., a sensor for measuring hydraulic piston stroke), a rotation sensor for measuring angular rotation of house 205, or any other devices capable of providing data from which the present orientation of a implement relative to the work vehicle (e.g., the operator station 26a, house 205 or the tracks 203) can be ascertained. Furthermore, in certain embodiments, the field of view of one or more imaging devices (e.g., camera) mounted to the work vehicle 202 may encompass the range of motion of the work vehicle and/or its implements, such as the boom 204 shown in FIG. 10. In such cases, the controller 48a may further perform image analysis of video feed(s) provided by such imaging devices to the present orientation of the implement (e.g., the boom 204) at a given juncture in time. Information regarding past and present orientations of the boom 204 (or another independently movable implement) may also be tracked, stored in the memory 52a, and then recalled from memory 52a by controller 48a as desired.

In more complex embodiments, the controller 48a may consider the present motion state of one or more components of the work vehicle and/or implements of the work vehicle in establishing the projected trajectory of the work vehicle. In such embodiments, work vehicle tracking sensors 68a may further include sensors for monitoring not only the orientation of the work vehicle and implements, but sensors for directly monitoring the motion state of the house 205, operator station 26a and/or boom 204 relative to the tracks 203. In this regard, one or more accelerometers or gyroscopes may be mounted to operator station 26a, tracks 203, boom 204 and house in embodiments. When present, such sensors may also be utilized to the rotation and/or a tilt angle of each component, when this information is utilized by the display system 22a in generating the below-described display symbology. In some embodiments, a multi-axis accelerometer and a multi-axis gyroscope implemented as Microelectromechanical System (MEMS) devices and packaged as, for example, an Inertial Measurement Unit (IMU) may be utilized; e.g., affixed to the operator station 26a, house 205, tracks 203 or boom 204 for capturing such data. Displacement measurements may further be considered over a predetermined time period to determine the motion state of the operator station 26a and house 205 relative to the tracks 203 by monitoring change in positioning over time. Any or all such data may be fed back to the controller 48a on a real-time or near real-time basis and utilized in combination with (or in lieu of) the operator input commands received from the input controls 66a in determining the present orientation and motion state of the work vehicle 202 and its components to project the trajectory of the work vehicle 202. In still other instances, the display system may lack such sensors, providing that the present orientation of the work vehicle 202 and any independently movable implements can be determined by the controller 48a as needed.

Other types of sensors 70a, which convey additional data or measurements relating to work vehicle, may further be included in the work vehicle data sources 54a in at least some implementations of the display system 22a. Such additional sensors 70a can include sensors providing data from which the load state of a work vehicle may be determined; that is, whether the work vehicle is presented fully loaded, unloaded, or perhaps partially loaded. Various types of sensors 70a can be utilized for this purpose including, for example, force sensors measuring the load carried by a work vehicle at a given time, distance measuring equipment for determining when an object is engaged by the work vehicle, and/or imaging devices providing video feeds from which the load state of a work vehicle can be determined by the controller 48a through image analysis. In other instances, such additional sensors 70a may be omitted from the display system 22a.

With continued reference to FIG. 11, the controller 48a of the display system 22a can assume any form suitable for performing the functions described throughout this document. Further, the term "controller," as appearing herein, is utilized in a non-limiting sense to generally refer to the processing architecture of the display system 22a. The controller 48a can encompass or be associated with one or more processors, control computers, navigational equipment pieces, computer-readable memories (including or in addition to the memory 52a), power supplies, storage devices, interface cards, and other standardized components. The controller 48a may also include or cooperate with any number of firmware and software programs or computer-readable instructions designed to carry-out the various process tasks, calculations, and control/display functions described herein.

The memory 52a can encompass any number and type of storage media suitable for storing computer-readable code or instructions, as well as other data utilized to support the operation of the display system 22a. Further, although illustrated as a separate block in FIG. 11, the memory 52a may be integrated into the controller 48a in embodiments as, for example, a system-in-package, a system-on-a-chip, or another type of microelectronic package or module. In embodiments, the memory 52a may store at least one local database 72a, 74a utilized in generating the below-described display symbology. For example, in certain implementations, the memory 52a may store a work vehicle attribute database 72a containing information pertaining to different work vehicle types, such as critical dimensions, key physical attributes, and/or files containing different graphical depictions of varying types of work vehicles. As a more specific example, as in the case of the work vehicle 202 shown in FIG. 10, the controller 48a may be configured to determine generate certain work vehicle-specific graphics corresponding to the determined type of work vehicle, as recalled from the database 72a, when generating one or more displays. Further discussion of this is provided below. Finally, in certain cases, the memory 52 may also contain other types of database(s) 74a, such as a terrain database storing information relating to the topology, key geographical features, and/or terrain type of swaths of land over which the work vehicle 202 may travel. In still other embodiments, the display system 22a may lack any either or both of database(s) 72a, 74a.

In embodiments of the display system 22a, the display device 50a may be affixed to the static structure of the operator station 26a and realized in a HUD or HDD device configuration. Alternatively, the display device 50a may be freely movable relative to the static structure of the operator station 26a; and may assume the form of, for example, a near-to-eye display device or other operator-worn display device. When assuming the form of an operator-worn display device or when assuming the form of a HUD device affixed to the work vehicle operator station 26a, the screen of the display device 50a may be fully or partially transparent and the below-described display symbology may be superimposed on or over the "real-world view" of the environment surrounding a work vehicle, as seen through the transparent display screen. The term "real-world," as appearing herein, refers to the actual view of the surrounding environment or work site 200 of a work vehicle 202, as opposed to a virtual or synthetic recreation thereof. In still further embodiments, the display device 50a can assume the form of a portable electronic display device, such as a tablet computer or laptop, which is carried into the work vehicle operator station (e.g., the operator station 26a of the work vehicle 202) by an operator and which communicates with the various other components of the display system 22a over a physical or wireless connection to perform the below-described display functionalities.

During operation, the display system 22a generates one or more displays 76a, 78a, each including display symbology 80a, 82a, on the display device(s) 50a. For example, as schematically indicated in FIG. 11, the display system 22a may generate a forward display 76a and/or a rear display 78a on the display device(s) 50a. In some instances, the display system 22a may generate the displays 76a, 78a concurrently. For example, in this case, the displays 76a, 78a may be presented on separate screens of multiple display devices 50a or, instead, on a single screen of one display device 50a in a picture-in-picture or side-by-side format. More commonly, however, the display system 22a may generate the displays 76a, 78a in a mutually exclusive fashion; that is, such that only one of the forward display 76a and the rear display 78a are presented on the display device(s) a given point in time. In this latter regard, the operator may be permitted to switch between a desired display 76a, 78a utilizing suitable operator controls, which may be located on or near the display device 50a. Alternatively, the controller 48a may automatically select the appropriate display 76a, 78a, based upon the particular direction in which the work vehicle 202 is presently traveling an (e.g., the orientation of the operator station 26a relative to the tracks 203 in the case of an excavator). Still other types of displays may be generated on the display device(s) 50a during operation of the display system 22a, as further discussed previously in connection with FIGS. 7 and 8.

Figure 12B:
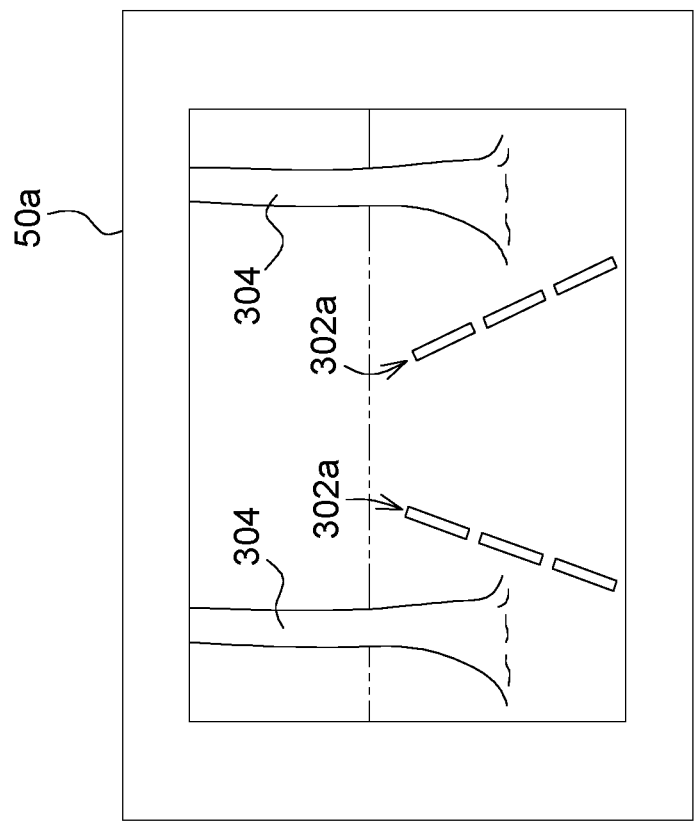
FIGS. 12A-12B illustrate a top view of work vehicle with a static dimension in a travel direction (FIG. 12A) and a display showing the static dimension of the work vehicle in the travel direction (FIG. 12B), either or both of which may be included in the example display system of FIG. 2.
Figure 12A:
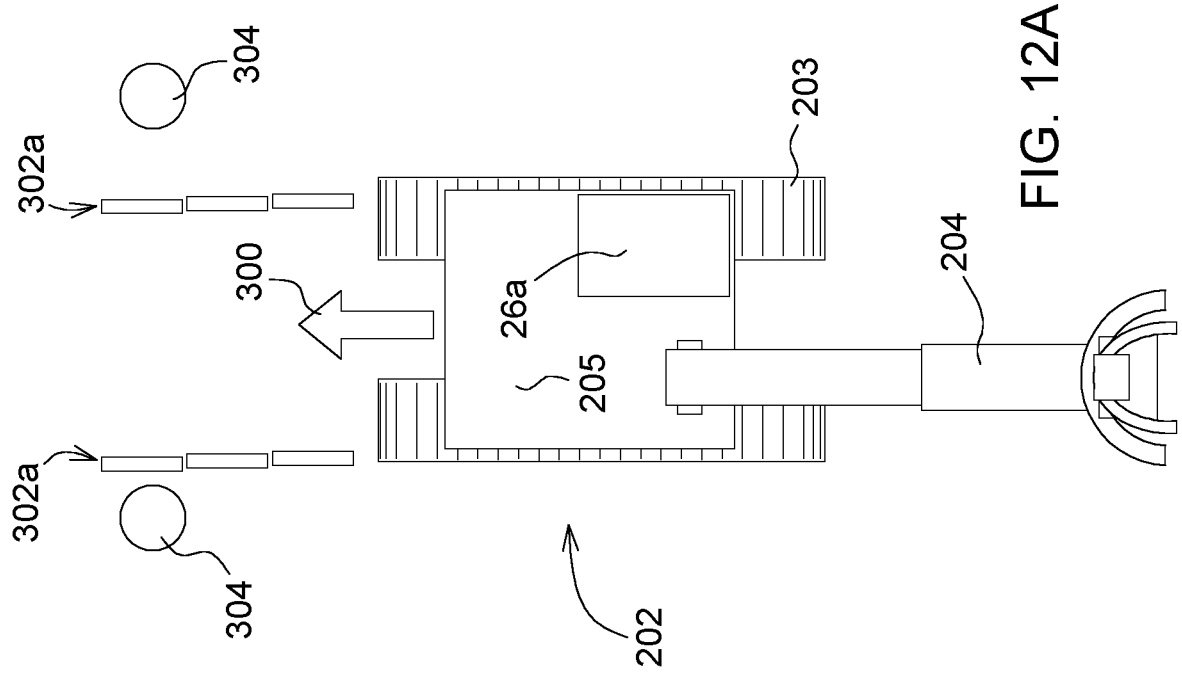
Figure 13B:
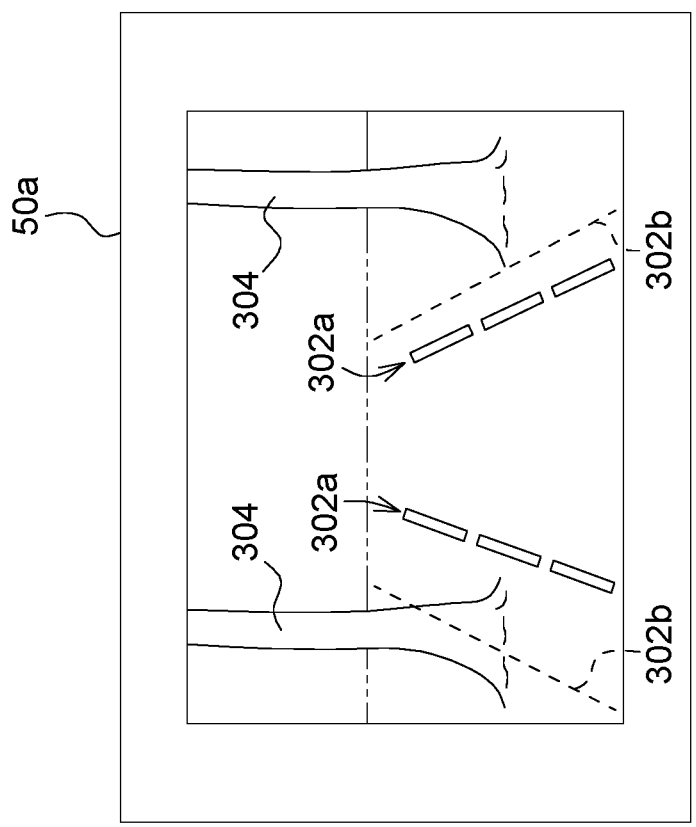
FIGS. 13A-13B illustrate a top view of work vehicle with static and dynamic dimensions in a travel direction (FIG. 13A) and a display showing the static and dynamic dimensions of the work vehicle in the travel direction (FIG. 13B), either or both of which may be included in the example display system of FIG. 2.
Figure 13A:
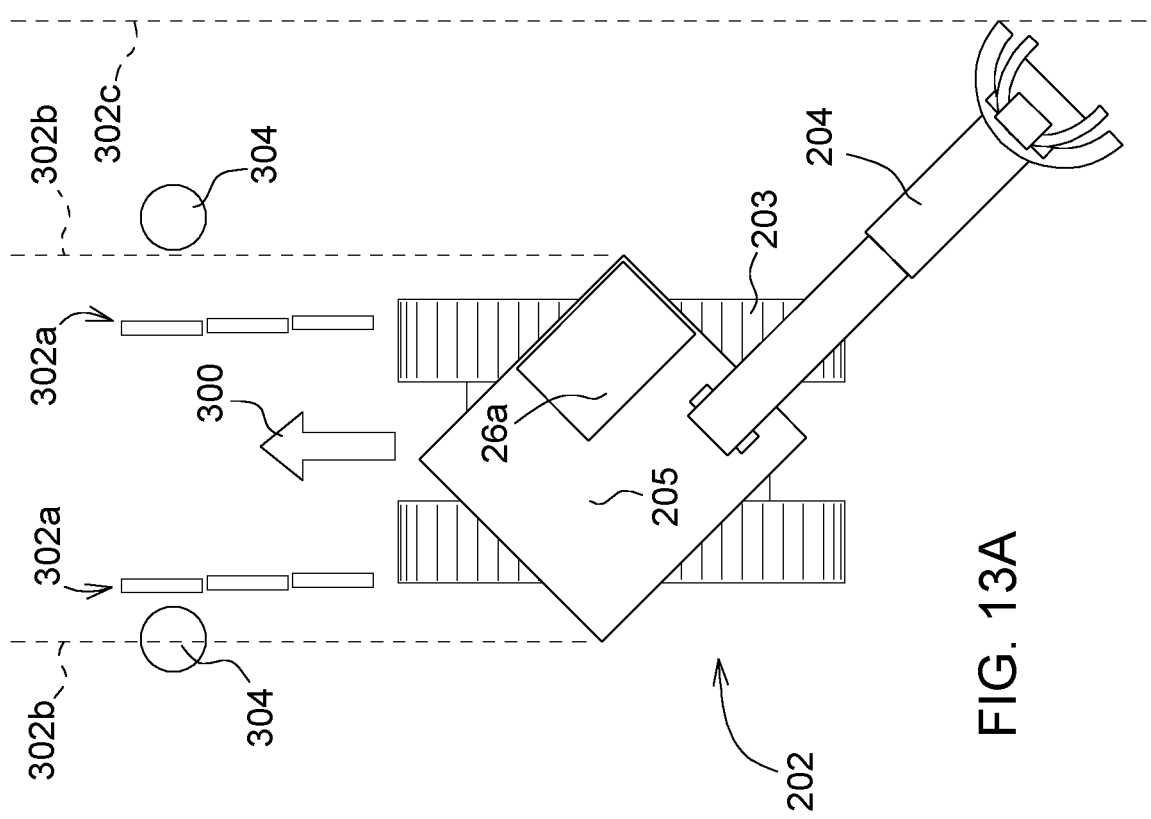

Progressing next to FIG. 12A-12B, there is shown a top view of work vehicle 202 with a graphical representation of travel direction 300 (reverse in this case), projected travel path 302a and obstacles 304. Further (and with respect to FIG. 12B) a representative display 50a (either as a HUD or HDD device) is shown with the projected travel path 302a passing between obstacles 304. In this example, projected travel path 302a consists of lines corresponding to the dimensions of work vehicle 202 (such as the corresponding width of one or more of the operator station 26a, tracks 203, boom 204 and/or house 205). In this example, work vehicle 202 has static dimensions—i.e., substantially uniform width and/or length with respect to the components of work vehicle 202—and thus a single projected travel path is generated on display 50a.

With respect to FIG. 13A-13B, there is again shown a top view of work vehicle 202 with a graphical representation of travel direction 300 (reverse) and obstacles 304. However, work vehicle 202 has rotated (e.g., as determined using an IMU) and thus is at angle to tracks 203. Work vehicle 202 again has a static dimension yielding a first projected travel path 302a corresponding to the width of tracks 203 but now additionally has one or more dynamic dimensions yielding additional projected trajectories 302b, 302c. For example, one dynamic dimension corresponds to an effective width of house 205 after being rotated and yields a second projected travel path 302b as seen FIG. 13A-13B. Still further, another dynamic dimension is shown corresponding to the effective length of boom 204 and which yields a third projected travel path 302c. In these examples, the first projected travel path 302a will again be between obstacles 304; however, second and third projected trajectories 302b, 302c will contact at least one of the obstacles 304. It can be appreciated by one of skill in the art the any number of component of a work vehicle and/or work implement components can be considered and combined to create one or more dynamic dimensions for display 50a. Again, in these examples work vehicle 202 has static dimensions (e.g., the fixed width of tracks 203) and also dynamic dimensions, the dynamic dimensions changing depending upon the variable orientation of the house 205, operator station 26a or boom 204 during use of the work vehicle 202 on worksite 200.

Figure 14B:
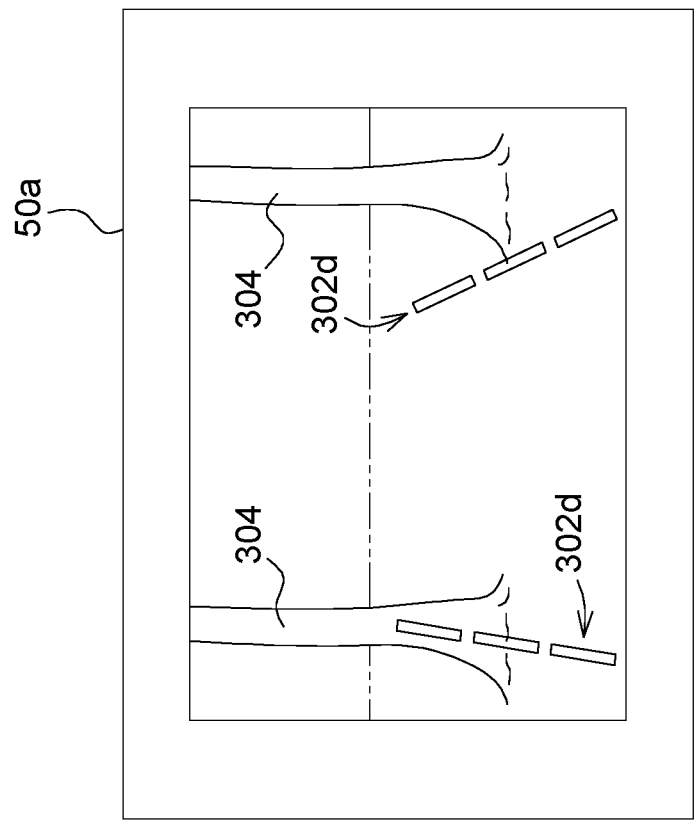
FIGS. 14A-14B illustrate a top view of work vehicle with a dynamic dimension in a travel direction (FIG. 14A) and a display showing the dynamic dimension of the work vehicle in the travel direction (FIG. 14B), either or both of which may be included in the example display system of FIG. 2.
Figure 14A:
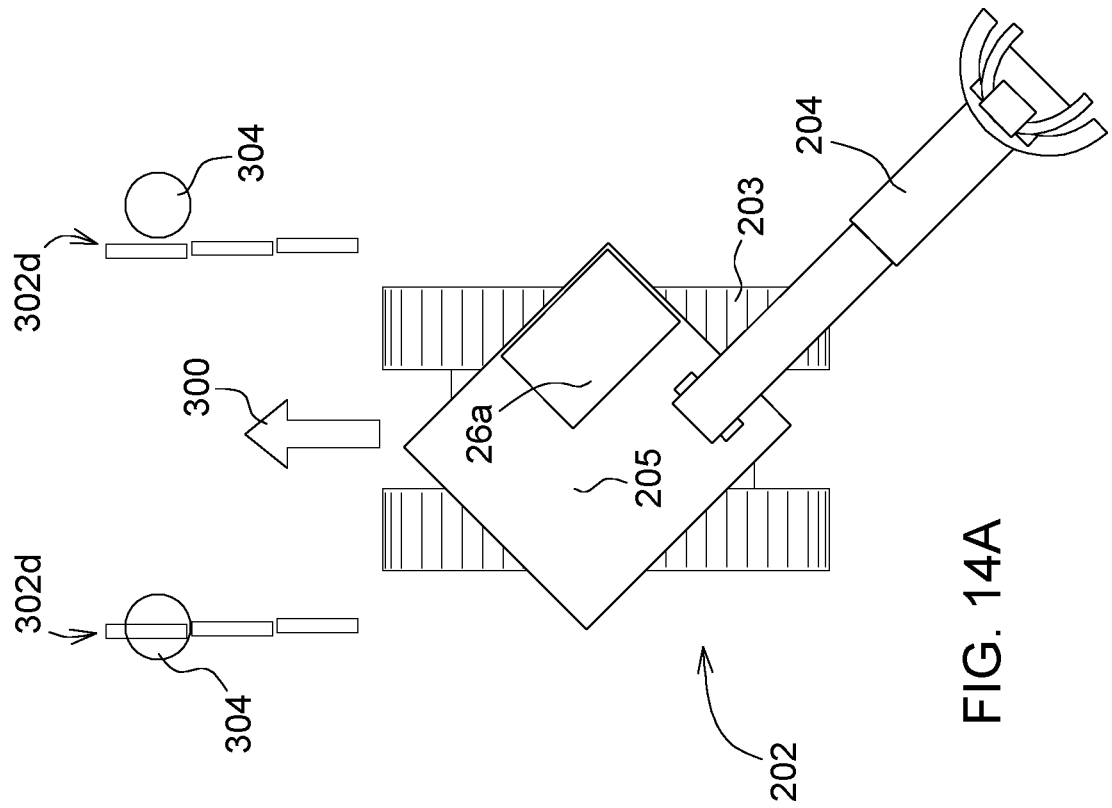

With respect to FIG. 14A-14B, it is within the scope of this disclosure that any number of static and dynamic dimensions may be realized and input into controller 48a to generate a single projected path 302d on display 50a (FIG. 14B) or any other number of projected paths needed for safe operation. As shown in FIG. 14A, a top view of work vehicle 202 is again shown with a graphical representation of travel direction 300 (reverse) and obstacles 304. Work vehicle 202 has rotated about a vertical axis as detected by the IMU and thus is at angle to tracks 203. However, in this example, a single projected path 302d has been generated as shown in FIGS. 14A and 14B corresponding to the effective width of the house 205 (also shown as 302b in FIG. 13A) rather than tracks 203. In another example, a single projected path (not shown) may be generated on display 50a corresponding to dynamic dimensions of boom 204 and house 205 (e.g., dashed line 302c in FIG. 13A).

Accordingly, controller 48a may be configured to receive any number of inputs (see FIG. 11) corresponding to one or more static or dynamic dimensions, and then selecting and displaying the projected paths which allows the operator to safely and efficiently operate work vehicle 202. In many cases, the projected path selected and displayed will correspond to the static and/or dynamic dimensions creating the greatest work vehicle width. However, it is contemplated that the projected path selected and displayed may also correspond to the static and/or dynamic dimensions creating the greatest work vehicle length, height, combination of width, height and length on a plane of interest or any number of other working vehicle characteristics.

Enumerated Examples of Implement Guidance Display Systems for Usage within Work Vehicles The following examples of the variable track joystick device are further provided, which are numbered for ease of reference.

1. A work vehicle guidance display system. In embodiments, the guidance display system includes at least one imaging device disposed on a work vehicle; a display disposed in the work vehicle configured to display images from the imaging device; and a controller. In embodiments, the controller is configured to: select a field of view of the imaging device to display; receive a static dimension associated with the work vehicle; receive a dynamic dimension associated with the work vehicle; and display on the display a field of view with a first machine travel path based on the static dimension and a second machine travel path based on the dynamic dimension.

2. The system of example 1 wherein the work vehicle comprises a first fixed portion and a second moveable portion, the first fixed portion having the static dimension and the second moveable portion having the dynamic dimension.

3. The system of example 2 wherein the controller is configured to display a first travel path for the first fixed portion and a second travel path for the second moveable portion.

4. The system of example 3 wherein the first travel path displayed on the display changes depending upon the movement of the first fixed portion.

5. The system of example 4 wherein the second travel path displayed on the display changes depending upon the movement of the second moveable portion and the first fixed portion.

6. The system of example 2 wherein the movement of the second moveable portion is determined using a rotation sensor associated with the work vehicle, the rotation sensor determining a rotation angle.

7. The system of example 1 further comprising an inertial measurement unit associated with the work vehicle, the inertial measurement unit sensing at least one of pitch, yaw and roll of the work vehicle.

8. The system of example 7 wherein the controller is configured to generate the first and second travel paths using the signal from the inertial measurement unit.

9. The system of example 1 wherein the controller is configured to recognize an obstacle within the field of view and provide a first warning to an operator of the work vehicle if the obstacle is within the first machine travel path of the work vehicle.

10. The system of example 1 wherein the controller is configured to recognize an obstacle within the field of view and provide a second warning to an operator of the work vehicle if the obstacle is within the second machine travel path of the work vehicle.

11. The system of example 1 wherein the controller is configured to transmit the field of view from the imaging device, the static dimension and the dynamic dimension to an offboard processor, the offboard processor configured to select the field of view, overlay the first and second machine travel paths onto the field view and transmit to the display on the work vehicle.

12. The system of example 1 further comprising an obstacle detection sensor disposed on the work vehicle, the obstacle detection configured to detect presence of an obstacle within the machine travel path.

13. The system of example 1 wherein the display is at least one of a plasma display panel, liquid crystal display panel, light-emitting diode, or holographic projection.

14. The system of example 1 wherein the imaging device is disposed to provide at least one of a forward field of view, rearward field of view, and opposing side fields of view.

15. The system of example 1 wherein the controller is configured to determine an operating state of the vehicle in response to the static dimension and dynamic dimension.

16. The system of example 1 wherein the controller is configured to display the future position of the work vehicle in response to the static dimension and dynamic dimension.

17. The system of example 1 wherein the controller is configured to receive a velocity of the work vehicle.

18. In further embodiments, a method for displaying work vehicle travel paths is utilized. In such embodiments, the method may include: selecting, with a controller on the work vehicle, a field of view from a plurality of imaging devices associated with the work vehicle; generating, with the controller, a first machine travel path based on a static dimension associated with the work vehicle; generating, with the controller, a second machine travel path based on a dynamic dimension associated with the work vehicle; and displaying, on a display within work vehicle, the field of view with the first machine travel path and the second machine travel path.

19. In additional embodiments, a work vehicle guidance display system is provided. In such embodiments, the system may include: at least one imaging device disposed on a work vehicle; a display disposed in the work vehicle configured to display images from the imaging device; and a controller configured to: select a field of view of the imaging device to display; receive a static dimension associated with the work vehicle; receive a dynamic dimension associated with the work vehicle; generate a first machine travel path based on the static dimension and a second machine travel path based on the dynamic dimension; and transmit to the display, the greater of the first machine travel path or the second machine travel path.

The example of claim 19 wherein the controller is configured to: receive a first static dimension associated with the work vehicle; receive a second static dimension associated with the work vehicle; receive a first dynamic dimension associated with the work vehicle; receive a second dynamic dimension associated with the work vehicle; generate travel paths for each of the first and second static and dynamic dimensions; and transmit to the display, the greater of the travel paths for each of the first and second static and dynamic dimensions.

CONCLUSION

The foregoing has described embodiments of guidance display systems for usage onboard work vehicles having one or more static and dynamic dimensions (e.g., due to the components of the work vehicle or due to work implements attached to the work vehicle). During operation, the guidance display system generates one or more displays presenting guidance symbology aiding an operator in controlling one or more work vehicles in an intended manner. In many instances, the guidance symbology will include or consist of symbology indicative of a projected travel path of a work vehicle, such as graphics visually identifying a path that the work vehicle is projected to travel given a present set of conditions; e.g., operator input commands, the current orientation of the work vehicle if independently movable relative to the work vehicle chassis, and possibly sensor data indicative of a current motion state of the work vehicle. Additionally, when generated, the graphics representing the projected path of the work vehicle may further convey other useful information, such as a maximum width of the work vehicle and projected future location(s) of key features of the work vehicle. By rapid visual reference to the guidance symbology, an operator gain improved awareness of the likely path followed by a work vehicle given a present set of conditions, thereby allowing the operator to better guide the work vehicle along an optimal path when carrying-out a task demanding relatively precise control of vehicle movement.

Embodiments of the guidance display system may also improve visibility or situational awareness of the surrounding environment in which a particular task is conducted by, for example, enabling an operator to switch between different views of the work vehicle work area, with the guidance symbology integrated into the selected view accordingly. Additionally, embodiments the guidance display system may generate multiple different displays for different work vehicles, such a forward guidance display including guidance symbology corresponding to a front end of the work vehicle and a rear guidance display including guidance symbology corresponding to a rear end of the work vehicle. In such embodiments, an operator may be permitted to switch between the guidance display, or the system may automatically select the appropriate guidance display, based upon the particular direction in which the work vehicle is presently traveling and/or the particular work vehicle currently controlled by the operator. Still over benefits and features are provided by embodiments of the guidance display system, as will be appreciated given the benefit of the foregoing description and the above-described figures.

While primary described above in connection with a particular type of work vehicle (a tractor loader or excavator) and particular types of work implements (bale spear attachments or excavator bucket), embodiments of the guidance display system can be utilized in conjunction with various other work vehicles and implements, with corresponding changes to the guidance symbology. For example, in embodiments, the guidance display system may be utilized in conjunction with work vehicles and work implements movable in various different degrees of freedom (e.g., excavator end effectors and feller buncher heads) to changes the attitude, orientation, vertical elevation, and other spatial aspects of the work vehicle and work implement. In such instances, the work implement under consideration may be supported by a boom assembly articulable in vertical directions, horizontal (side-to-side) directions, and so on, with the resulting curvature of any projected travel path path (as generated on one or more guidance displays) varying accordingly. So too may markers, icons, or other such graphics identifying the projected future orientation of key work vehicle features (e.g., the saw blade of a feller buncher head) also vary in accordance with the type of work vehicle under consideration.

In one embodiment, the guidance display system is deployed onboard a work vehicle having a chassis supporting an operator station and a work vehicle configured to move relative to the work vehicle chassis. The guidance display system may include a display device 50a within the operator station of the work vehicle, work vehicle data sources configured to provide work vehicle tracking data (e.g., describing a heading of the work vehicle, an orientation of the work vehicle, and/or a position of the work vehicle relative to the chassis) and a controller in signal communication with the display device 50a and with the work vehicle data sources. The controller is configured to: (i) receive the work vehicle tracking data from the implement data sources; (ii) determine a projected travel path of the work vehicle based on the implement tracking data; and (iii) generate, on the display device, work vehicle trajectory symbology indicative of the projected travel path of the work vehicle.

In one example, the controller 48a may be comprised of one or more of software and/or hardware in any proportion. In such an example, controller 48a may reside on a computer-based platform such as, for example, a server or set of servers. Any such server or servers may be a physical server(s) or a virtual machine(s) executing on another hardware platform or platforms. Any server, or for that matter any computer-based system, systems or elements described herein, will be generally characterized by one or more control units and associated processing elements and storage devices communicatively interconnected to one another by one or more busses or other communication mechanism for communicating information or data. In one example, storage within such devices may include a main memory such as, for example, a random access memory (RAM) or other dynamic storage devices, for storing information and instructions to be executed by the control unit(s) and for storing temporary variables or other intermediate information during the use of the control unit described herein.

In one example, the controller 48a may also include a static storage device such as, for example, read only memory (ROM), for storing static information and instructions for the control unit(s). In one example, the controller 48a may include a storage device such as, for example, a hard disk or solid state memory, for storing information and instructions. Such storing information and instructions may include, but not be limited to, instructions to compute, which may include, but not be limited to processing and analyzing working vehicle data or information of all types. Such data or information may pertain to, but not be limited to, weather, ground conditions, working vehicle characteristics, job requirements or historical data, future forecast data, economic data associated with working vehicle data or information.

In one example, the processing and analyzing of data by the controller 48a may pertain to processing and analyzing agronomic factors obtained from externally gathered image data, and issue alerts if so required based on pre-defined acceptability parameters. RAMs, ROMs, hard disks, solid state memories, and the like, are all examples of tangible computer readable media, which may be used to store instructions which comprise processes, methods and functionalities of the present disclosure. Exemplary processes, methods and functionalities of the controller 48a may include determining a necessity for generating and presenting alerts in accordance with examples of the present disclosure. Execution of such instructions causes the various computer-based elements of controller 48a to perform the processes, methods, functionalities, operations, etc., described herein. In some examples, the controller 48a of the present disclosure may include hard-wired circuitry to be used in place of or in combination with, in any proportion, such computer-readable instructions to implement the disclosure.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a control unit, computer system or computing element (or portion thereof) such as, but not limited to, one or more or some combination of: a visual organizer system, a request generator, an Internet coupled computing device, a computer server, etc. In one example, the control unit, computer system and/or the computing element may manipulate and transform information and/or data represented as physical (electronic) quantities within the control unit, computer system's and/or computing element's processor(s), register(s), and/or memory(ies) into other data similarly represented as physical quantities within the control unit, computer system's and/or computing element's memory(ies), register(s) and/or other such information storage, processing, transmission, and/or display components of the computer system(s), computing element (s) and/or other electronic computing device(s). Under the direction of computer-readable instructions, the control unit, computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

What is claimed is:

1. A work vehicle guidance display system comprising:
    at least one imaging device disposed on a work vehicle;
    a display disposed in the work vehicle configured to display images from the imaging device; and
    a controller configured to:
    select a field of view of the imaging device to display;
    receive at least two static dimensions associated with the work vehicle;
    receive at least two dynamic dimensions associated with the work vehicle; and
    display on the display a field of view the greater of a first machine travel path based on the static dimensions and a second machine travel path based on the dynamic dimensions.

2. The system of claim 1 wherein the work vehicle comprises a first fixed portion and a second moveable portion, the first fixed portion having at least one of the static dimensions and the second moveable portion having at least one of the dynamic dimensions.

3. The system of claim 2 wherein the controller is configured to display a first travel path for the first fixed portion and a second travel path for the second moveable portion.

4. The system of claim 2 wherein the movement of the second moveable portion is determined using a rotation sensor associated with the work vehicle, the rotation sensor determining a rotation angle.

5. The system of claim 3 wherein the first travel path displayed on the display changes depending upon the movement of the first fixed portion.

6. The system of claim 5 wherein the second travel path displayed on the display changes depending upon the movement of the second moveable portion and the first fixed portion.

7. The system of claim 1 further comprising an inertial measurement unit associated with the work vehicle, the inertial measurement unit sensing at least one of pitch, yaw and roll of the work vehicle.

8. The system of claim 7 wherein the controller is configured to generate the first and second travel paths using a signal from the inertial measurement unit.

9. The system of claim 1 wherein the controller is configured to recognize an obstacle within the field of view and provide a first warning to an operator of the work vehicle if the obstacle is within the first machine travel path of the work vehicle.

10. The system of claim 1 wherein the controller is configured to recognize an obstacle within the field of view and provide a second warning to an operator of the work vehicle if the obstacle is within the second machine travel path of the work vehicle.

11. The system of claim 1 wherein the controller is configured to transmit the field of view from the imaging device, the static dimensions and the dynamic dimensions to an offboard processor, the offboard processor configured to select the field of view, overlay the first and second machine travel paths onto the field view and transmit to the display on the work vehicle.

12. The system of claim 1 further comprising an obstacle detection sensor disposed on the work vehicle, the obstacle detection configured to detect presence of an obstacle within the machine travel path.

13. The system of claim 1 wherein the display is at least one of a plasma display panel, liquid crystal display panel, light-emitting diode, or holographic projection.

14. The system of claim 1 wherein the imaging device is disposed to provide at least one of a forward field of view, rearward field of view, and opposing side fields of view.

15. The system of claim 1 wherein the controller is configured to determine an operating state of the vehicle in response to the static dimensions and dynamic dimensions.

16. The system of claim 1 wherein the controller is configured to display the future position of the work vehicle in response to the static dimensions and dynamic dimensions.

17. The system of claim 1 wherein the controller is configured to receive a velocity of the work vehicle.

18. A method for displaying work vehicle travel paths, the method comprising:
    selecting, with a controller on the work vehicle, a field of view from a plurality of imaging devices associated with the work vehicle;
    generating, with the controller, a first machine travel path based on the greater of at least two static dimensions associated with the work vehicle;
    generating, with the controller, a second machine travel path based on the greater of at least two dynamic dimensions associated with the work vehicle; and
    displaying, on a display within work vehicle, the field of view with the first machine travel path and the second machine travel path.

19. A work vehicle guidance display system comprising:
    at least one imaging device disposed on a work vehicle;
    a display disposed in the work vehicle configured to display images from the imaging device; and
    a controller configured to:
    select a field of view of the imaging device to display;
    receive a first static dimension associated with the work vehicle;
    receive a second static dimension associated with the work vehicle;
    receive a first dynamic dimension associated with the work vehicle;
    receive a second dynamic dimension associated with the work vehicle;
    generate travel paths for each of the first and second static and dynamic dimensions; and
    transmit to the display, the greater of the travel paths for each of the first and second static and dynamic dimensions.

* * * * *